US012579554B2

(12) United States Patent
Hardin et al.

(10) Patent No.: US 12,579,554 B2
(45) Date of Patent: Mar. 17, 2026

(54) EXCLUSIVE DELIVERY OF CONTENT WITHIN GEOGRAPHIC AREAS

(71) Applicants: Ryan Hardin, Henderson, TX (US); Andrew Hill, Houston, TX (US)

(72) Inventors: Ryan Hardin, Henderson, TX (US); Andrew Hill, Houston, TX (US)

( * ) Notice: Subject to any disclaimer, the term of this patent is extended or adjusted under 35 U.S.C. 154(b) by 0 days.

(21) Appl. No.: 18/764,076

(22) Filed: Jul. 3, 2024

(65) Prior Publication Data

US 2024/0362679 A1      Oct. 31, 2024

Related U.S. Application Data

(63) Continuation of application No. 17/182,809, filed on Feb. 23, 2021, now Pat. No. 12,056,736, which is a
(Continued)

(51) Int. Cl.
*G06Q 30/0251* (2023.01)
*G06Q 30/02* (2023.01)
(Continued)

(52) U.S. Cl.
CPC ......... *G06Q 30/0261* (2013.01); *G06Q 30/02* (2013.01); *G06Q 30/0266* (2013.01);
(Continued)

(58) Field of Classification Search
CPC .............. G06Q 30/0261; G06Q 30/02; G06Q 30/0266; G06Q 30/0267; H04M 3/42357;
(Continued)

(56) References Cited

U.S. PATENT DOCUMENTS

| | | | |
|---|---|---|---|
| 6,418,311 B1 | 7/2002 | Chmaytelli et al. | |
| 6,449,498 B1 | 9/2002 | Kirbas et al. | |
| | (Continued) | | |

FOREIGN PATENT DOCUMENTS

| | | |
|---|---|---|
| KR | 20040021267 | 3/2004 |
| KR | 20080019867 | 3/2008 |
| WO | WO2008082794 A2 | 7/2008 |

OTHER PUBLICATIONS

AdMob, Inc., "Help For Advertisers—Target the Specific User You Want to Reach", http://www.admob.com/home/help/helpfiles/Advertisers/Target, May 19, 2009.
(Continued)

*Primary Examiner* — Olumide Ajibade Akonai
(74) *Attorney, Agent, or Firm* — Davidson Kappel LLC

(57)      ABSTRACT

Application developers can request to have their applications registered for use with a content delivery platform. The operator of the content delivery platform establishes perimeters defining geographic areas, and maintains records reserving particular areas for delivery of content associated with particular sponsors. Registered applications running on mobile devices can request content from the content delivery platform. Based at least in part on the request, the content delivery platform can identify a target location, which may be the location of the mobile device, or some other location indicated in the request. A mobile device can be provided content based on the relationship of the target location to the geographic areas, so that a registered application running on a mobile device with a target location contained within a geographic area assigned to a particular sponsor will receive content related to that sponsor.

11 Claims, 7 Drawing Sheets

Related U.S. Application Data continuation of application No. 16/019,285, filed on Jun. 26, 2018, now Pat. No. 10,984,447, which is a continuation of application No. 15/694,786, filed on Sep. 2, 2017, now Pat. No. 10,049,387, which is a continuation of application No. 15/009,961, filed on Jan. 29, 2016, now Pat. No. 9,779,418, which is a continuation of application No. 14/608,285, filed on Jan. 29, 2015, now Pat. No. 9,286,625, which is a continuation of application No. 13/856,392, filed on Apr. 3, 2013, now Pat. No. 8,977,247, which is a continuation of application No. 12/434,094, filed on May 1, 2009, now Pat. No. 8,433,296.

(51) Int. Cl.

| | |
|---|---|
| *H04L 67/53* | (2022.01) |
| *H04M 3/42* | (2006.01) |
| *H04W 4/021* | (2018.01) |
| *H04W 4/029* | (2018.01) |
| *H04W 4/18* | (2009.01) |

(52) U.S. Cl.
CPC .... *G06Q 30/0267* (2013.01); *H04M 3/42357* (2013.01); *H04W 4/021* (2013.01); *H04W 4/029* (2018.02); *H04W 4/18* (2013.01); *H04L 67/53* (2022.05); *H04M 2242/14* (2013.01)

(58) Field of Classification Search
CPC . H04M 2242/14; H04W 4/021; H04W 4/029; H04W 4/18; H04W 4/02; H04L 67/53
See application file for complete search history.

(56) References Cited

U.S. PATENT DOCUMENTS

| | | | |
|---|---|---|---|
| 6,542,729 B1 | 4/2003 | Chmaytelli et al. | |
| 6,542,732 B1 | 4/2003 | Khazaka et al. | |
| 6,628,938 B1 | 9/2003 | Rachabathuni et al. | |
| 6,701,144 B2 | 3/2004 | Kirbas et al. | |
| 6,721,578 B2 | 4/2004 | Minear et al. | |
| 6,753,842 B1 | 6/2004 | Williams et al. | |
| 6,782,369 B1 | 8/2004 | Carrott | |
| 6,792,244 B2 | 9/2004 | Ross et al. | |
| 6,810,323 B1 | 10/2004 | Bullock et al. | |
| 6,847,888 B2 | 1/2005 | Fox et al. | |
| 6,867,733 B2 | 3/2005 | Sandhu et al. | |
| 6,947,772 B2 | 9/2005 | Minear et al. | |
| 6,996,394 B2 | 2/2006 | Minear et al. | |
| 7,009,556 B2 | 3/2006 | Stewart | |
| 7,039,398 B2 | 5/2006 | Chmaytelli et al. | |
| 7,054,649 B2 | 5/2006 | Yamazaki et al. | |
| 7,065,388 B2 | 6/2006 | Minear et al. | |
| 7,080,402 B2 | 7/2006 | Bates et al. | |
| 7,089,264 B1 | 8/2006 | Guido et al. | |
| 7,092,964 B1 | 8/2006 | Dougherty et al. | |
| 7,096,004 B2 | 8/2006 | Minear et al. | |
| 7,096,117 B1 | 8/2006 | Gale et al. | |
| 7,099,663 B2 | 8/2006 | Lundblade et al. | |
| 7,103,368 B2 | 9/2006 | Teshima | |
| 7,113,772 B2 | 9/2006 | Chmaytelli et al. | |
| 7,124,370 B2 | 10/2006 | Fish | |
| 7,133,685 B2 | 11/2006 | Hose et al. | |
| 7,164,986 B2 | 1/2007 | Humphries et al. | |
| 7,200,673 B1 | 4/2007 | Augart | |
| 7,203,967 B2 | 4/2007 | Chmaytelli et al. | |
| 7,207,802 B2 | 4/2007 | Wilson | |
| 7,219,145 B2 | 5/2007 | Chmaytelli et al. | |
| 7,219,303 B2 | 5/2007 | Fish | |
| 7,263,351 B2 | 8/2007 | Ross et al. | |
| 7,324,815 B2 | 1/2008 | Ross et al. | |
| 7,457,628 B2 | 11/2008 | Blumberg et al. | |
| 7,519,470 B2 | 4/2009 | Brasche et al. | |
| 7,536,172 B2 | 5/2009 | Minear et al. | |
| 7,536,695 B2 | 5/2009 | Alam et al. | |
| 7,565,447 B2 | 7/2009 | Gellens et al. | |
| 7,577,522 B2 | 8/2009 | Rosenberg | |
| 7,610,048 B2 | 10/2009 | Ross et al. | |
| 7,627,425 B2 | 12/2009 | Salmre et al. | |
| 7,644,126 B2 | 1/2010 | Chmaytelli | |
| 7,684,792 B2 | 3/2010 | Lundblade et al. | |
| 7,712,660 B2 | 5/2010 | Keohane et al. | |
| 7,734,285 B2 | 6/2010 | Chmaytelli et al. | |
| 7,743,407 B2 | 6/2010 | Sprigg et al. | |
| 7,769,767 B2 | 8/2010 | Petersen | |
| 7,784,089 B2 | 8/2010 | Lundblade et al. | |
| 7,814,106 B2 | 10/2010 | Guido et al. | |
| 7,848,765 B2 | 12/2010 | Phillips et al. | |
| 7,917,390 B2 * | 3/2011 | Feinberg ............... | G06Q 30/02 705/14.63 |
| 7,921,287 B2 | 4/2011 | Sprigg et al. | |
| 8,010,134 B2 | 8/2011 | Barnes et al. | |
| 8,014,762 B2 | 9/2011 | Chmaytelli et al. | |
| 8,020,001 B2 | 9/2011 | Lundblade et al. | |
| 8,037,515 B2 | 10/2011 | Lundblade | |
| 8,112,076 B2 | 2/2012 | Lundblade et al. | |
| 8,135,777 B2 | 3/2012 | Colligan et al. | |
| 8,165,079 B2 | 4/2012 | Lee et al. | |
| 8,219,115 B1 | 7/2012 | Nelissen | |
| 8,249,577 B2 | 8/2012 | Chmaytelli et al. | |
| 8,321,680 B2 | 11/2012 | Gantman et al. | |
| 8,326,315 B2 | 12/2012 | Phillips et al. | |
| 8,374,628 B1 | 2/2013 | Nelissen et al. | |
| 8,385,944 B1 | 2/2013 | Nelissen | |
| 8,403,755 B2 | 3/2013 | Kerr | |
| 8,424,068 B2 | 4/2013 | Lundblade | |
| 8,468,261 B2 | 6/2013 | Chmaytelli et al. | |
| 8,505,078 B2 | 8/2013 | Hohlfeld et al. | |
| 8,510,773 B1 | 8/2013 | Abou-Rizk et al. | |
| 8,520,511 B2 | 8/2013 | Chmaytelli et al. | |
| 8,536,999 B2 | 9/2013 | Holcman et al. | |
| 8,588,766 B2 | 11/2013 | Lundblade et al. | |
| 8,620,275 B2 | 12/2013 | Minear et al. | |
| 8,620,994 B2 | 12/2013 | Boyd et al. | |
| 8,630,634 B2 | 1/2014 | Chmaytelli et al. | |
| 8,644,847 B1 | 2/2014 | Nelissen et al. | |
| 8,660,613 B2 | 2/2014 | Minear et al. | |
| 8,750,101 B2 | 6/2014 | Oh et al. | |
| 8,761,714 B2 | 6/2014 | Son et al. | |
| 8,762,205 B2 | 6/2014 | Narayanaswami et al. | |
| 8,798,613 B2 | 8/2014 | Macnaughtan et al. | |
| 8,826,145 B1 | 9/2014 | Kirkpatrick et al. | |
| 8,856,905 B2 | 10/2014 | Lundblade | |
| 8,862,150 B2 | 10/2014 | Phillips et al. | |
| 8,868,581 B2 | 10/2014 | Ryu et al. | |
| 8,903,407 B2 | 12/2014 | Chmaytelli | |
| 8,909,248 B2 | 12/2014 | Phillips et al. | |
| 8,942,995 B1 | 1/2015 | Kerr | |
| 8,943,164 B2 | 1/2015 | Kies et al. | |
| 8,983,488 B2 | 3/2015 | Sweeney et al. | |
| 9,015,692 B1 | 4/2015 | Clavel | |
| 9,122,542 B1 | 9/2015 | Nelissen | |
| 9,128,956 B2 | 9/2015 | Salmre et al. | |
| 9,148,431 B2 | 9/2015 | Chmaytelli | |
| RE45,780 E | 10/2015 | Petersen | |
| 9,231,763 B2 | 1/2016 | Lundblade et al. | |
| 9,251,520 B2 | 2/2016 | Shen et al. | |
| 9,270,818 B1 | 2/2016 | Nelissen et al. | |
| 9,286,652 B2 | 3/2016 | Takishima | |
| 9,338,601 B2 | 5/2016 | Issa et al. | |
| 9,373,116 B1 | 6/2016 | Kerr | |
| 9,400,403 B2 | 7/2016 | Hesline | |
| 9,418,366 B1 | 8/2016 | Mayers | |
| 9,436,806 B2 | 9/2016 | Chmaytelli et al. | |
| 9,503,834 B2 | 11/2016 | Ross et al. | |
| 9,555,334 B2 | 1/2017 | Bernard et al. | |
| 9,621,549 B2 | 4/2017 | Benoit et al. | |
| 9,654,923 B2 | 5/2017 | Phillips et al. | |
| 9,654,978 B2 | 5/2017 | Lundblade et al. | |
| 9,668,096 B2 | 5/2017 | Philips et al. | |
| 9,781,096 B2 | 10/2017 | Sade et al. | |
| 9,836,591 B2 | 12/2017 | Archibald et al. | |
| 9,936,347 B1 | 4/2018 | Nelissen | |

(56) References Cited

U.S. PATENT DOCUMENTS

| | | |
|---|---|---|
| 10,002,242 B2 | 6/2018 | Jakobsson et al. |
| 10,019,602 B2 | 7/2018 | Kahana et al. |
| 10,043,170 B2 | 8/2018 | Minear et al. |
| 10,135,613 B2 | 11/2018 | McLean et al. |
| 10,248,775 B2 | 4/2019 | Archibald et al. |
| 10,321,264 B2 | 6/2019 | Phillips et al. |
| 10,602,307 B2 | 3/2020 | Phillips et al. |
| 10,606,996 B2 | 3/2020 | Archibald et al. |
| RE48,001 E | 5/2020 | Lundblade et al. |
| 10,667,080 B2 | 5/2020 | Phillips et al. |
| 10,691,677 B2 | 6/2020 | Ryu et al. |
| 10,708,712 B2 | 7/2020 | Phillips et al. |
| 10,721,587 B2 | 7/2020 | Phillips et al. |
| 10,728,697 B2 | 7/2020 | Phillips et al. |
| 10,728,698 B2 | 7/2020 | Phillips et al. |
| 10,728,699 B2 | 7/2020 | Phillips et al. |
| 11,044,575 B2 | 6/2021 | Phillips et al. |
| 11,070,936 B2 | 7/2021 | Phillips et al. |
| 11,082,798 B2 | 8/2021 | Phillips et al. |
| 11,115,777 B2 | 9/2021 | Phillips et al. |
| 2002/0055880 A1 | 5/2002 | Unold |
| 2002/0077084 A1 | 6/2002 | Zellner |
| 2002/0107706 A1 | 8/2002 | Oliver et al. |
| 2002/0107795 A1 | 8/2002 | Minear et al. |
| 2002/0123373 A1 | 9/2002 | Kirbas et al. |
| 2002/0142762 A1 | 10/2002 | Chmaytelli et al. |
| 2002/0142844 A1 | 10/2002 | Kerr |
| 2002/0161633 A1 | 10/2002 | Jacob et al. |
| 2002/0169977 A1 | 11/2002 | Chmaytelli |
| 2002/0173315 A1 | 11/2002 | Chmaytelli et al. |
| 2002/0183056 A1 | 12/2002 | Lundblade et al. |
| 2002/0194325 A1 | 12/2002 | Chmaytelli et al. |
| 2003/0028621 A1 | 2/2003 | Furlong et al. |
| 2003/0051169 A1 | 3/2003 | Sprigg et al. |
| 2003/0060189 A1 | 3/2003 | Minear et al. |
| 2003/0061504 A1 | 3/2003 | Sprigg et al. |
| 2003/0064705 A1 | 4/2003 | Desiderio |
| 2003/0078886 A1 | 4/2003 | Minear et al. |
| 2003/0101454 A1 | 5/2003 | Ozer et al. |
| 2003/0139192 A1 | 7/2003 | Chmaytelli et al. |
| 2003/0142039 A1 | 7/2003 | Minear et al. |
| 2003/0143990 A1 | 7/2003 | Minear et al. |
| 2003/0198346 A1 | 10/2003 | Meifu et al. |
| 2003/0207683 A1 | 11/2003 | Lempio |
| 2003/0208401 A1 | 11/2003 | Karsten et al. |
| 2004/0002301 A1 | 1/2004 | Ross et al. |
| 2004/0058651 A1 | 3/2004 | Ross et al. |
| 2004/0087347 A1 | 5/2004 | Minear et al. |
| 2004/0097244 A1 | 5/2004 | Yamazaki et al. |
| 2004/0110515 A1 | 6/2004 | Blumberg et al. |
| 2004/0137886 A1 | 7/2004 | Ross |
| 2004/0176105 A1 | 9/2004 | Ashmore et al. |
| 2004/0198334 A1 | 10/2004 | Chmaytelli et al. |
| 2004/0203616 A1 | 10/2004 | Minear et al. |
| 2004/0203681 A1 | 10/2004 | Ross et al. |
| 2004/0204719 A1 | 10/2004 | Ross et al. |
| 2004/0205048 A1 | 10/2004 | Pizzo et al. |
| 2004/0214550 A1 | 10/2004 | Jenkins |
| 2004/0220906 A1 | 11/2004 | Gargi et al. |
| 2004/0224702 A1 | 11/2004 | Chaskar |
| 2004/0248551 A1 | 12/2004 | Rowitch et al. |
| 2004/0253965 A1 | 12/2004 | Sato et al. |
| 2005/0009465 A1 | 1/2005 | Ross et al. |
| 2005/0054324 A1 | 3/2005 | Chmaytelli et al. |
| 2005/0055574 A1 | 3/2005 | Chmaytelli |
| 2005/0058067 A1 | 3/2005 | Chmaytelli et al. |
| 2005/0097330 A1 | 5/2005 | Lundblade |
| 2005/0114694 A1 | 5/2005 | Wager et al. |
| 2005/0118999 A1 | 6/2005 | Zhu |
| 2005/0144294 A1 | 6/2005 | Gellens et al. |
| 2005/0187823 A1 | 8/2005 | Howes |
| 2005/0192878 A1 | 9/2005 | Minear et al. |
| 2005/0282535 A1 | 12/2005 | Chmaytelli et al. |
| 2006/0009198 A1 | 1/2006 | Kasai et al. |
| 2006/0058037 A1 | 3/2006 | Kenyon |
| 2006/0064346 A1 | 3/2006 | Steenstra et al. |
| 2006/0075040 A1 | 4/2006 | Chmaytelli |
| 2006/0095957 A1 | 5/2006 | Lundblade et al. |
| 2006/0107327 A1 | 5/2006 | Sprigg et al. |
| 2006/0116817 A1 | 6/2006 | Salmre et al. |
| 2006/0136292 A1 | 6/2006 | Bhati et al. |
| 2006/0136297 A1 | 6/2006 | Willis et al. |
| 2006/0141993 A1 | 6/2006 | Minear et al. |
| 2006/0149630 A1 | 7/2006 | Elliott et al. |
| 2006/0223494 A1 | 10/2006 | Chmaytelli et al. |
| 2006/0236098 A1 | 10/2006 | Gantman et al. |
| 2006/0253453 A1 | 11/2006 | Chmaytelli et al. |
| 2006/0253481 A1 | 11/2006 | Guido et al. |
| 2006/0270421 A1 | 11/2006 | Phillips et al. |
| 2006/0281440 A1 | 12/2006 | Minear et al. |
| 2006/0287958 A1 | 12/2006 | Lundblade et al. |
| 2007/0066365 A1 | 3/2007 | Minear |
| 2007/0112741 A1 | 5/2007 | Crawford |
| 2007/0129888 A1 | 6/2007 | Rosenberg |
| 2007/0180111 A1 | 8/2007 | Chmaytelli et al. |
| 2007/0185768 A1 | 8/2007 | Vengroff et al. |
| 2007/0192409 A1 | 8/2007 | Kleinstern |
| 2007/0198698 A1 | 8/2007 | Boyd et al. |
| 2007/0198841 A1 | 8/2007 | Lundblade et al. |
| 2007/0214180 A1 | 9/2007 | Crawford |
| 2007/0219708 A1 | 9/2007 | Brasche et al. |
| 2007/0244633 A1 | 10/2007 | Phillips et al. |
| 2008/0004952 A1 | 1/2008 | Koli |
| 2008/0032666 A1 | 2/2008 | Hughes et al. |
| 2008/0032703 A1 | 2/2008 | Krumm et al. |
| 2008/0033805 A1 | 2/2008 | Padin |
| 2008/0046311 A1 | 2/2008 | Shahine |
| 2008/0086356 A1 | 4/2008 | Glassman |
| 2008/0094256 A1 | 4/2008 | Koen |
| 2008/0098420 A1 | 4/2008 | Khivesara et al. |
| 2008/0109317 A1 | 5/2008 | Singh |
| 2008/0125099 A1 | 5/2008 | Brown et al. |
| 2008/0125133 A1 | 5/2008 | Chmaytelli |
| 2008/0137828 A1 | 6/2008 | Chmaytelli |
| 2008/0146338 A1 | 6/2008 | Bernard et al. |
| 2008/0154728 A1 | 6/2008 | Thomas |
| 2008/0155017 A1 | 6/2008 | Minear et al. |
| 2008/0162032 A1 | 7/2008 | Wuersch et al. |
| 2008/0163073 A1 | 7/2008 | Becker et al. |
| 2008/0172291 A1* | 7/2008 | Hurowitz .............. G06Q 30/02 |
| | | 705/14.1 |
| 2008/0182569 A1 | 7/2008 | Chmaytelli et al. |
| 2008/0215524 A1 | 9/2008 | Fuchs et al. |
| 2008/0225815 A1 | 9/2008 | Minear et al. |
| 2008/0262897 A1 | 10/2008 | Howarter et al. |
| 2008/0268876 A1 | 10/2008 | Gelfand et al. |
| 2008/0270235 A1 | 10/2008 | Yoon |
| 2008/0275772 A1 | 11/2008 | Suryanarayana |
| 2008/0307498 A1 | 12/2008 | Johnson et al. |
| 2008/0313039 A1 | 12/2008 | Altberg et al. |
| 2009/0024476 A1 | 1/2009 | Baar et al. |
| 2009/0029721 A1 | 1/2009 | Doraswamy |
| 2009/0061890 A1 | 3/2009 | Andreasson et al. |
| 2009/0063424 A1 | 3/2009 | Iwamura et al. |
| 2009/0089288 A1 | 4/2009 | Petersen et al. |
| 2009/0094248 A1 | 4/2009 | Petersen |
| 2009/0131080 A1 | 5/2009 | Nadler et al. |
| 2009/0135805 A1 | 5/2009 | Lee et al. |
| 2009/0157632 A1 | 6/2009 | Ryu et al. |
| 2009/0163227 A1 | 6/2009 | Collins |
| 2009/0164602 A1 | 6/2009 | Kies et al. |
| 2009/0165083 A1 | 6/2009 | McLean et al. |
| 2009/0183264 A1 | 7/2009 | Chmaytelli et al. |
| 2009/0186595 A1 | 7/2009 | Son et al. |
| 2009/0191860 A1 | 7/2009 | Oh et al. |
| 2009/0197582 A1 | 8/2009 | Lewis et al. |
| 2009/0210700 A1 | 8/2009 | Nomura et al. |
| 2009/0239510 A1 | 9/2009 | Sennett |
| 2009/0275348 A1 | 11/2009 | Weinreich et al. |
| 2010/0042320 A1 | 2/2010 | Salmre et al. |
| 2010/0070351 A1 | 3/2010 | Kang |
| 2010/0075697 A1 | 3/2010 | Gupta et al. |
| 2010/0130179 A1 | 5/2010 | Colligan et al. |
| 2010/0131501 A1 | 5/2010 | Deeming |

(56)                References Cited

U.S. PATENT DOCUMENTS

| | | | |
|---|---|---|---|
| 2010/0173608 | A1 | 7/2010 | Lundblade et al. |
| 2010/0248709 | A1 | 9/2010 | Chmaytelli et al. |
| 2010/0269156 | A1 | 10/2010 | Hohlfeld et al. |
| 2010/0312646 | A1 | 12/2010 | Gupta et al. |
| 2010/0325708 | A1 | 12/2010 | Lundblade et al. |
| 2011/0010383 | A1 | 1/2011 | Thompson et al. |
| 2011/0107107 | A1 | 5/2011 | Gantman et al. |
| 2012/0030742 | A1 | 2/2012 | Lundblade |
| 2012/0126974 | A1 | 5/2012 | Phillips et al. |
| 2012/0129553 | A1 | 5/2012 | Phillips et al. |
| 2012/0137349 | A1 | 5/2012 | Lundblade et al. |
| 2013/0072177 | A1 | 3/2013 | Ross et al. |
| 2013/0182838 | A1 | 7/2013 | Kelley et al. |
| 2013/0227667 | A1 | 8/2013 | Lundblade |
| 2013/0283395 | A1 | 10/2013 | Chmaytelli et al. |
| 2013/0326596 | A1 | 12/2013 | Hohlfeld et al. |
| 2014/0013390 | A1 | 1/2014 | Sade et al. |
| 2015/0005017 | A1 | 1/2015 | Ryu et al. |
| 2015/0065177 | A1 | 3/2015 | Phillips et al. |
| 2015/0148078 | A1 | 5/2015 | Phillips et al. |
| 2015/0163632 | A1 | 6/2015 | Phillips et al. |
| 2015/0382141 | A1 | 12/2015 | Salmre et al. |
| 2016/0021245 | A1 | 1/2016 | Chmaytelli |
| 2016/0028725 | A1 | 1/2016 | Benoit et al. |
| 2016/0063281 | A1 | 3/2016 | Kahana et al. |
| 2016/0171198 | A1 | 6/2016 | Archibald et al. |
| 2016/0227411 | A1 | 8/2016 | Lundblade et al. |
| 2016/0283064 | A1 | 9/2016 | Ross et al. |
| 2016/0299854 | A1 | 10/2016 | Deivasigamani et al. |
| 2016/0308849 | A1 | 10/2016 | Sade et al. |
| 2017/0053108 | A1 | 2/2017 | Jakobsson et al. |
| 2017/0289197 | A1 | 10/2017 | Mandyam et al. |
| 2017/0310677 | A1 | 10/2017 | Chmaytelli et al. |
| 2018/0068106 | A1 | 3/2018 | Archibald et al. |
| 2018/0124564 | A1 | 5/2018 | Phillips et al. |
| 2019/0156006 | A1 | 5/2019 | Archibald et al. |
| 2019/0373402 | A1 | 12/2019 | Phillips et al. |
| 2019/0373406 | A1 | 12/2019 | Phillips et al. |
| 2019/0380000 | A1 | 12/2019 | Phillips et al. |
| 2019/0380001 | A1 | 12/2019 | Phillips et al. |
| 2019/0380002 | A1 | 12/2019 | Phillips et al. |
| 2020/0112821 | A1 | 4/2020 | Phillips et al. |
| 2020/0112822 | A1 | 4/2020 | Phillips et al. |
| 2020/0112823 | A1 | 4/2020 | Phillips et al. |
| 2020/0112824 | A1 | 4/2020 | Phillips et al. |
| 2020/0112825 | A1 | 4/2020 | Phillips et al. |
| 2020/0120442 | A1 | 4/2020 | Phillips et al. |
| 2022/0103966 | A1 | 3/2022 | Phillips et al. |

OTHER PUBLICATIONS

Admob, Inc., "Iphone for Advertisers", http://www.admob.com/home/help/helpfiles/Advertisers/iPhone Ad, May 19, 2009.
AdMob, Inc., "Help for Advertisers—Ad Pricing", http://www.admob.com/home/help/helpfiles/Advertisers/Ad Pricing, May 19, 2009.
Amadeo, The (Updated) History of Android (Oct. 31, 2016), http://arstechnica.com/gadgets/2014/06/building-android-a-40000-word-hisotry-of-google-mobile-os/.
Wayback Machine, "Iphone App Advertisement", http://www.blog.yieldbuild.com/2008/08/21/iphone-app-advertising/, Aug. 24, 2008.
Android Team, Android Developer Challenge Judges and Top 50 Details (May 14, 2008), https://android-developers.googleblog.com/2008/05/android-developer-challenge-judges-and.html.
Android Team, Android Developer Challenge Slide Deck (May 14, 2008), available at https://android.googlesource.com/platform/frameworks/base/+archive/54b6cfa9a9e5b861a9930af873580d6dc20f773c.tar.gz("adc1r1_deck.pdf").
Android Team, Android Developers Have Risen to the Challenge (Apr. 17, 2008), hhttps://android-developers.googleblog.com/2008/04/android-developers-have-risen-to.html.

Android Team, Android is Now Open Source (Oct. 21, 2008), https://android-developers.googleblog.com/2008/10/android-is-now-open-source.html.
Android Team, Android Market: A User-Driven Content Distribution System (Aug. 28, 2008), https://android-developers.googleblog.com/2008/08/android-market-user-driven-content.html.
Android Team, Android SDK m5-rc14 Now Available (Feb. 13, 2008), https://android-devlopers.googleblog.com/2008/02/android-sdk-m5-rc14-now-available.html.
Android Team, Android SDK Update: m5-rc15 Released (Mar. 3, 2008), https://android-developers.googleblog.com/2008/03/android-sdk-update-m5-rc15-released.html.
Android Team, Android: The First Week (Nov. 16, 2007), https://android-developers.googleblog.com/2007/11/android-first-week.html.
Android Team, Announcing a Beta Release of the Android SDK (Aug. 18, 2008), https://android-developers.googleblog.com/2008/08/annoucing-beta-release-of-android-sdk.html.
Android Team, Announcing the Android 1.0 SDK, Release 1 (Sep. 23, 2008), https://android-developers.googleblog.com/2008/09/annoucing-android-10-sdk-release-1.html.
Android Team, Announcing: Apps for Android (Mar. 4, 2008), https://android-developers.googleblog.com/2008/03/announcing-apps-for-android.html.
Android Team, Life Can Be Tough: Here Are a Few SDK Improvements to Make It a Little Easier (Dec. 14, 2007), https://android-developers.googleblog.com/2007/12/life-can-be-tough-here-are-few-sdk.html.
Android Team, Panoramio (Sep. 22, 2008), https:;;android-developers.googleblog.com/2008/09/panoramio.html.
Android Team, SDK Archives (last updated Aug. 11, 2021), https://developer.android.com/sdk/older_releases.
Android Team, The Stories Behind the Apps (Oct. 28, 2008), https://android-developers.googleblog.com/2008/10/stories-behind-apps.html.
Android Team, The Top 50 Applications (May 12, 2008), https://android-developers.googleblog.com/2008/05/top-50-applications.html.
Android Team, This is the Droid You're Looking for (Nov. 12, 2007), https://android-developers.googleblog.com/2007/11/posted-by-jason-chen-android-advocate.html.
Android Team, WikiNotes for Android: Routing Intents (Mar. 19, 2008), https://android-developers.googleblog.com/2008/03/wikinotes-for-android-routing-intent.html.
Aosp Initial Contribution (Oct. 21, 2008), https://android.googlesource.com/platform/frameworks/base/+/54b6cfa989e5b861a9930af873580d6dc20f773c.
Barbeau et al., Location API 2.0 for J2ME—A New Standard in Location for Java-Enabled Mobile Phones, Jan. 31, 2008, Computer Communications.
Bauer et al., Information Management and Exchange in the Nexus Platform, Version 2.0, Sep. 3, 2004, Universitat Stuttgart.
Cheng, It's Official: Google Announces Open-Source Mobile Phone OS, Android (Nov. 5, 2007), https://arstechnica.com/gadgets/2007/11/its-official-google-announces-open-source-mobile-phone-os-android/.
Claim Construction Order—*Hardin et al.* v. *Samsung Elecs. Co., Ltd et al.*, 2:21-cv-00290-JRG, ECF No. 86 (E.D. Tex. Aug. 25, 2022).
Declaration of David Williams ISO 387 Patent IPR Petition—1327, Aug. 2, 2022.
Declaration of David Williams ISO 387 Patent IPR Petition—1328, Aug. 2, 2022.
Declaration of David Williams ISO 387 patent IPR Petition—1329, Aug. 2, 2022.
Declaration of David Williams ISO 418 Patent IPR Petition—1330, Aug. 2, 2022.
Declaration of David Williams ISO 418 Patent IPR Petition—1331, Aug. 2, 2022.
Declaration of David Williams ISO 418 Patent IPR Petition—1332, Aug. 2, 2022.
Declaration of David Williams ISO 447 Patent IPR Petition—1333, August, Aug. 2, 2022.

(56) References Cited

OTHER PUBLICATIONS

Declaration of David Williams ISO 447 Patent IPR Petition—1334, Aug. 2, 2022.
Declaration of David Williams ISO 447 Patent IPR Petition—1335, Aug. 2, 2022.
Defendants' Invalidity Contentions Pursuant Local Rules 3-3 and 3-4 (case No. 2:21-cv-290-JRG, E.D. Tex.) dated Mar. 17, 2022.
Durr et al. ("Durr 2003"), On a Location Model for Fine-Grained Geocast, Oct. 2003, UbiComp.
Durr et al. ("Durr 2004"), Nexus—A Platform for Context-Aware Applications, Jun. 2004, GI/ITG KuVS Fachgesprach Ortsbezogene Anwendungen und Dienste.
Exhibit 1016—Complaint—*Hardin et al.* v. *Samsung Elecs. Co., Ltd et al.*, 2:21-cv-00290-JRG, ECF No. 1 (E.D. Tex. Jul. 30, 2021.
Exhibit 1019—Plaintiffs' Objections and Response To Defendants' Second Set of Interrogatories To Plaintiff, *Hardin et al.* v. *Samsung Elecs. Co., Ltd et al.*, 2:21-cv-002900-JRG, served Jul. 1, 2022.
Exhibit 1020—Geofencing, Techopedia, https://www.techopedia.com/definition/14937/geofencing.
Exhibit 1021—Jonathan P. Munson & Vineet K. Gupta, Location-Based Notification as a General-Purpose Service, Proceeding of the 2nd International Workshop on Mobile Commerce 40 (2002).
Exhibit 1022—What We Do, Locating What's Important to You, Cell-Loc,http://web.archive.org/web/20030411221815/http://cellloc.com/what_locating.html.
Exhibit 1023—Alan Cohen, Location, Location, Location, PC Mag., available at https://books.google.com/books?id=elvagv988JgC&pg=PA82#v=onepage&q&f=false.
Exhibit 1028—Plaintiffs' Claim Construction Brief—*Hardin et al.* v. *Samsung Elecs. Co., Ltd et al.*, 2:21-cv-00290-JRG, ECF 58 (E.D. Tex. Jul. 8, 2022).
Exhibit 1029—Defendants' Claim Construction Brief—*Hardin et al.* v. *Samsung Elecs. Co., Ltd et. al.* 2:21-cv-00290-JRG, ECG 67 (E.D. Tex. Jul. 25, 2022).
Exhibit A-1—Invalidity of U.S. Pat. No. 9,779,418 ("418 Patent") by U.S. Patent Application Publication No. 2006/0223494A1 ("Chmaytelli").
Exhibit A-10—of U.S. Pat. No. 9,779,418 ("418") by U.S. Pat. No. 7,054,649 ("Yamazaki").
Exhibit A-11—Invalidity of U.S. Pat. No. 9,779,418 ("418") by Natalia Marmasse & Chris Schmandt, Location Aware Information Delivery with ComMotion, in Lecture Notes in Computer Science 1927: Handheld and Ubiquitous Computing, Second International Symposium at 157 (Sep. 25-27, 2000) ("Marmasse").
Exhibit A-12—Invalidity of U.S. Pat. No. 9,779,418 ("418 Patent") by David Parsons, The Java Location API, Dr. Dobb's Journal, Jan. 2006, at 53 ("Parsons").
Exhibit A-13—Invalidity of U.S. Pat. No. 9,779,418 ("418") by Anand Ranganathan et al., MiddleWhere: A Middleware for Location Awareness in Ubiquitous Computing Applications, 3231 Lecture Notes in Comp. Sci. 397 (2004) ("Ranganathan").
Exhibit A-14—Invalidity of U.S. Pat. No. 9,779,418 ("418 Patent") by Timothy Sohn et al., Place-its: A Study of Location-Based Reminders on Mobile Phones, UbiComp '05: Proceedings of the 7th International Conference on Ubiquitous Computing 232 (Sep. 2005) ("Sohn").
Exhibit A-15—Invalidity of U.S. Pat. No. 9,779,418 ("418 Patent") by Version 1.0 of the Android Operating System, Beta Versions of Android, and Android Software Development Kits ("Android 2007-2008").
Exhibit A-16—Invalidity of U.S. Pat. No. 9,779,418 ("418 Patent") by Location API for Java™ 2 Mirco Edition, Version 1.0.1 ("JSR 179").
Exhibit A-17—Invalidity of U.S. Pat. No. 9,779,418 ("418 Patent") by U.S. Pat. No. 9,286,625 ("625 Patent").
Exhibit A-18—Subject Matter Eligibility Contentions for U.S. Pat. No. 9,779,418 ("418 Patent").
Exhibit A-2—Invalidity of U.S. Pat. No. 9,779,418 ("418") by U.S. Pat. No. 7,089,264 ("Guido").

Exhibit A-3—Invalidity of U.S. Pat. No. 9,779,418 ("418") by U.S. Patent App. Pub. No. 2008/0032666A1 ("Hughes").
Exhibit A-4 Invalidity of U.S. Pat. No. 9,779,418 ("418") by U.S. Pat. No. 8,219,115 ("Nelissen").
Exhibit A-5 Invalidity of U.S. Pat. No. 9,779,418 ("418") by U.S. App. Pub. No. 2009/0089288A1 ("Petersen").
Exhibit A-6 Invalidity of U.S. Pat. No. 9,779,418 ("418") by U.S. Patent App. Pub. No. 2006/0270421A1 ("Phillips").
Exhibit A-7—Invalidity of U.S. Pat. No. 9,779,418 ("418") by U.S. Patent Application Pub. No. 2007/0129888A1 ("Rosenberg").
Exhibit A-8—Invalidity of U.S. Pat. No. 9,779,418 ("418") by U.S. Patent Application Publication No. US 2009/0157632A1 ("Ryu").
Exhibit A-9—Invalidity of U.S. Pat. No. 9,779,418 ("418") by U.S. Patent Application Pub. No. 2006/0116817A1 ("Salmre").
Exhibit B-1—Invalidity of U.S. Pat. No. 10,049,387 ("387 Patent") by U.S. Patent Application Publication No. 2006/0223494 A1 ("Chmaytelli").
Exhibit B-10—Invalidity of U.S. Pat. No. 10,049,387 ("387 Patent") by U.S. Pat. No. 7,054,649 ("Yamazaki").
Exhibit B-11—Invalidity of U.S. Pat. No. 10,049,387 ("387 Patent") by Natalia Marmasse & Chris Schmandt, Location-Aware Information Delivery with ComMotion, in Lecture Notes in Computer Science 1927: Handheld and Ubiquitous Computing, Second International Symposium at 157 (Sep. 25-27, 2000) ("Marmasse").
Exhibit B-12—Invalidity of U.S. Pat. No. 10,049,387 ("387 Patent") by David Parsons, The Java Location API, Dr. Dobb's Journal, Jan. 2006, at 53 ("Parsons").
Exhibit B-13—Invalidity of U.S. Pat. No. 10,049,387 ("387 Patent") by Anand Ranganathan et al. MiddleWhere: A Middleware for Location Awareness in Ubiquitous Computing Applications, 3231 lecture Notes in Comp. Sci. 397 (2004) ("Ranganathan").
Exhibit B-14—Invalidity of U.S. Pat. No. 10,049,387 ("387 Patent") by Timothy Sohn et al., Place-its: a Study of Location-Based Reminders on Mobile Phones, UbiComp '05: Proceedings of the 7th International Conference on Ubiquitous Computing 232 (Sep. 2005) ("Sohn").
Exhibit B-15—Invalidity of U.S. Pat. No. 10,049,387 ("387 Patent") by Version 1.0 of the Android Operating System, Beta Versions of Android, and Android Software Development Kits ("Android 2007-2008").
Exhibit B-16—Invalidity of U.S. Pat. No. 10,049,387 ("387 Patent") by Location API for Java™ 2 Micro Edition, Version 1.0.1 ("JSR 179").
Exhibit B-17—Invalidity of U.S. Pat. No. 10,049,387 ("387 Patent") by U.S. Pat. No. 9,779,418 ("418 Patent").
Exhibit B-18—Subject Matter Eligibility Contentions for U.S. Pat. No. 10,049,387 ("387 Patent").
Exhibit B-2—Invalidity of U.S. Pat. No. 10,049,387 ("387 Patent") by U.S. Pat. No. 7,089,264 ("Guido").
Exhibit B-3—Invalidity of U.S. Pat. No. 10,049,387 ("387 Patent") by U.S. Patent App. Pub. No. 2008/0032666 A1 ("Hughes").
Exhibit B-4—Invalidity of U.S. Pat. No. 10,049,387 ("387 Patent") by U.S. Pat. No. 8,219,115 ("Nelissen").
Exhibit B-5—Invalidity of U.S. Pat. No. 10,049,387 ("387 Patent") by U.S. App. Pub. No. 2009/0089288 A2 ("Petersen").
Exhibit B-6—Invalidity of U.S. Pat. No. 10,049,387 ("387 Patent") by U.S. Patent App. Pub. No. 2006/0270421A1 ("Phillips").
Exhibit B-7—Invalidity of U.S. Pat. No. 10,049,387 ("387 Patent") by U.S. Patent Application Pub. No. 2007/01298881A1 ("Rosenberg").
Exhibit B-8—Invalidity of U.S. Pat. No. 10,049,387 ("387 Patent") by U.S. Patent Application Publication No. US 2009/0157632A1 ("Ryu").
Exhibit B-9—Invalidity of U.S. Pat. No. 10,049,387 ("387 Patent") by U.S. Patent Application Pub. No. 2006/0116817A1 ("Salmre").
Exhibit C-1—Invalidity of U.S. Pat. No. 10,984,447 ("447 Patent") by U.S. patent Application Publication No. 2006//0223494A1 (Chmaytelli).
Exhibit C-10—Invalidity of U.S. Pat. No. 10,984,447 ("447 Patent") by U.S. Pat. No. 7,054,649 ("Yamazaki").
Exhibit C-11—Invalidity of U.S. Pat. No. 10,984,447 (447 Patent) by Naralia Marmasse & Chris Schmandt, Location-Aware Information Delivery with ComMotion in Lecture Notes in Computer

(56) References Cited

OTHER PUBLICATIONS

Science 1927: Handheld and Ubiquitous Computing ,Second International Symposium at 157 (Sep. 25-27, 2000) ("Marmasse").
Exhibit C-12—Invalidity of U.S. Pat. No. 10,984,447 ("447 Patent") by David Parsons, The Java Location API, Dr. Dobb's Journal, Jan. 26, 2006, at 53 ("Parsons").
Exhibit C-13—Invalidity of U.S. Pat. No. 10,984,447 ("447 Patent") by Anand Ranganathan et al., MiddleWhere: A Middleware for Location Awareness in Ubiquitous Computing Applications, 3231 Lecture Notes in Comp. Sci. 397 (2004) ("Ranganathan").
Exhibit C-14—Invalidity of U.S. Pat. No. 10,984,447 ("447 Patent") by Timothy Sohn et al., Place-its: A Study of Location Based Reminders on Mobile Phones, UbiComp '05: Proceedings of the $7^{th}$ International Conference on Ubiquitous Computing 232 (Sep. 2005) ("Sohn").
Exhibit C-15—Invalidity of U.S. Pat. No. 10,984,447 ("447 Patent") by Version 1.0 of the Android Operating System, Beta Version of Android, and Android Software Development Kits ("Android 2007-2008").
Exhibit C-16—Invalidity of U.S. Pat. No. 10,984,447 ("447 Patent") by Location API for Java™ 2 Micro Edition, Version 1.0.1 ("JSR 179").
Exhibit C-17—Invalidity of U.S. Pat. No. 10,984,447 ("447 Patent") by U.S. Pat. No. 10,049,387 ("387 Patent").
Exhibit C-18—Subject Matter Eligibility Contentions for U.S. Pat. No. 10,984,447 ("447 Patent").
Exhibit C-2—Invalidity of U.S. Pat. No. 10,984,447 ("447 Patent") by U.S. Pat. No. 7,089,264 ("Guido").
Exhibit C-3—Invalidity of U.S. Pat. No. 10,984,447 ("447 Patent") by U.S. Patent App. N. 2008/0032666A1 ("Hughes").
Exhibit C-4—Invalidity of U.S. Pat. No. 10,984,447 ("447 Patent") by U.S. Pat. No. 8,219,115 ("Neilssen").
Exhibit C-5—Invalidity of U.S. Pat. No. 10,984,447 ("447 Patent") by U.S. App. Pub. No. 2009/0089288A1 ("Petersen").
Exhibit C-6—Invalidity of U.S. Pat. No. 10,984,447 ("447 Patent") by U.S. App. Pub. No. 2006/0270421A1 ("Phillips").
Exhibit C-7—Invalidity of U.S. Pat. No. 10,984,447 ("447 Patent") by U.S. App. Pub. No. 2007/0129888A1 ("Rosenberg").
Exhibit C-8—Invalidity of U.S. Pat. No. 10,984,447 ("447 Patent") by U.S. Application Publication No. 2009/0157632A1 ("Ryu").
Exhibit C-9—Invalidity of U.S. Pat. No. 10,984,447 ("447 Patent") by U.S. Application Publication No. 2006/0116817A1 ("Salmre").
Fuchs, Realizing Location-Based Push-Services on Mobile Devices, Jul. 18, 2002, Institut fur Informatik der Technischen Universitat Munchen.
Google, Inc., "How are ads ranked?", http://adwords:google.com/support/bin/answer.py?hl=en&answer=6111,May 18, 2009.
Google, Inc., "How do ads cycle through the search page results?", http://adwords.google.com/support/bin/answer.py?hl=en&answer=87402,May 18, 2009.
Google, Inc., "How do I create a mobile ad?", http://adwords.google.com/support/bin/answer=29488&cbid,May 18, 2009.
Google, Inc., "How does customized targeting work?", http://adwords.google.com/support/bin/answer.py?answer=116,May 18, 2009.
Google, Inc., "Lesson 3c: Language & Location Targeting", http://www.google.com/adwords/learningcenter/text/print-19158.html,May 19, 2009.
Google, Inc., "What are mobile ads?", http://adwords.google.com/support/bin/answer.py?answer-29492&cbid,May 18, 2009.
Google, Inc., "What are the different options for targeting ads to mobile phones and devices?", https://adwords.google.com/support/bin/answer=107265&hl=en.sub.--US,May 18, 2009.
Google, Inc., "What is the position preference?", http://adwords.google.com/support/bin/answer.py?hl=en$answer=31788,May 19, 2002.
Google, Inc., "Why can't I see my ad?", http://adwords.google.com/support/bin/answer.py?hl=en&answer=6105,May 18, 2009.

IPR2022-01327, Decision Granting Institution of Inter Partes Review of U.S. Pat. No. 10,049,387 B2, Feb. 7, 2023.
IPR2022-01328, Decision Granting Institution of Inter Partes Review of U.S. Pat. No. 10,049,387 B2, Feb. 8, 2023.
IPR2022-01329, Decision Granting Institution of Inter Partes Review of U.S. Pat. No. 10,049,387 B2, Feb. 8, 2023.
IPR2022-01330, Decision Granting Institution of Inter Partes Review of U.S. Pat. No. 9,779,418 B2, Feb. 8, 2023.
IPR2022-01331, Decision Granting Institution of Inter Partes Review of U.S. Pat. No. 9,779,418B2, Feb. 7, 2023.
IPR2022-01332, Decision Granting Institution of Inter Partes Review of U.S. Pat. No. 9,779,418 B2, Feb. 8, 2023.
IPR2022-01333, Decision Granting Institution of Inter Partes Review of U.S. Pat. No. 10,984,447 B2, Feb. 7, 2023.
IPR2022-01334, Decision Granting Institution of Inter Partes Review of U.S. Pat. No. 10,984,447 B2, Feb. 8, 2023.
IPR2022-01335, Decision Granting Institution of Inter Partes Review of U.S. Pat. No. 10,984,447 B2, Feb. 8, 2023.
Jing et al., Client-Server Computing in Mobile Environments, Jun. 1999, ACM Computing Surveys, vol. 31, No. 2.
Location API for Java™ 2 Micro Edition, Version 1.0.1.
Marmasse et al., Location-Aware Information Delivery with ComMotion, 2000, Springer-Verlag Berlin Heidelberg.
Martens et al., OGAS—Open Geographic Applications Standard: An Open User-Centric Description Language for Exchangeable Location-Based Services, Sep. 4, 2008, GI/ITG KuVS Fachgesprach Ortsbezogene Anwendungen und Dienste.
Miller, MWC08: Hands-on With a Working Google Android Device (Feb. 12, 2008), https://www.zdnet.com/article/mwc08-hands-on-with-a-working-google-android-device/.
Nicklas et al., NexusScout: An Advanced Location-Based Application on a Distributed, Open Mediation Platform, 2003, VLDB Conference.
Parsons, The Java Location API, Jan. 2006, Dr. Dobb's Journal.
Petition for Inter Partes Revie of U.S. Pat. No. 9,779,418—Case IPR2022-01332, Aug. 2, 2022.
Petition for Inter Partes Review of U.S. Pat. No. 10,049,387—Case IPR2022-01327, Aug. 2, 2022.
Petition for Inter Partes Review of U.S. Pat. No. 10,049,387—Case IPR2022-01328, Aug. 2, 2022.
Petition for Inter Partes Review of U.S. Pat. No. 10,049,387—Case IPR2022-01329, Aug. 2, 2022.
Petition for Inter Partes Review of U.S. Pat. No. 10,984,447—Case IPR2022-01333, Aug. 2, 2022.
Petition for Inter Partes Review of U.S. Pat. No. 10,984,447—Case IPR2022-01334, Aug. 2, 2022.
Petition for Inter Partes Review of U.S. Pat. No. 10,984,447—Case IPR2022-01335, Aug. 2, 2022.
Petition for Inter Partes Review of U.S. Pat. No. 9,779,418—Case IPR2002-01330, Aug. 2, 2022.
Petition for Inter Partes Review of U.S. Pat. No. 9,779,418—Case IPR2022-01331, Aug. 2, 2022.
Press Release, Open Handset Alliance, Leading Mobile Players Demonstrate Early Look of an Android at Mobile World Congress 2008 in Barcelona (Feb. 11, 2008), https://www.openhandsetalliance.com/press_021108.html.
Press Release, Open Handset Alliance, Open Handset Alliance Releases Android SDK (Nov. 12, 2007), https://www.openhandsetalliance.com/press_111207.html.
Ranganathan et al., MiddleWhere: A Middleware for Location Awareness in Ubiquitous Computing Applications, 2004.
Scheifler, X Window System Protocol, X Version 11, Release 6.9, 7.0 ("X Window System Protocol 2005"), 2005.
Sohn et al., Place-its: A Study of Location-Based Reminders on Mobile Phones, Sep. 11, 2005, UbiComp.

* cited by examiner

200

EXCLUSIVE DELIVERY OF CONTENT WITHIN GEOGRAPHIC AREAS

CROSS REFERENCE TO RELATED APPLICATIONS

This continuation patent application claims priority from U.S. Non-provisional patent application having Ser. No. 17/182,809, filed 23 Feb. 2021, entitled "EXCLUSIVE DELIVERY OF CONTENT WITHIN GEOGRAPHIC AREAS", which claims priority from U.S. Non-provisional patent application having Ser. No. 16/019,285, filed 26 Jun. 2018, entitled "EXCLUSIVE DELIVERY OF CONTENT WITHIN GEOGRAPHIC AREAS", now U.S. Pat. No. 10,984,447 issued on 20 Apr. 2021, which claims priority from U.S. Non-provisional patent application having Ser. No. 15/694,786, filed 2 Sep. 2017, entitled "EXCLUSIVE DELIVERY OF CONTENT WITHIN GEOGRAPHIC AREAS", now U.S. Pat. No. 10,049,387 issued on 14 Aug. 2018, which claims priority from U.S. Non-provisional patent application having Ser. No. 15/009,961, filed 29 Jan. 2016, entitled "EXCLUSIVE DELIVERY OF CONTENT WITHIN GEOGRAPHIC AREAS", now U.S. Pat. No. 9,779,418 issued on 3 Oct. 2017, which claims priority from U.S. Non-provisional patent application having Ser. No. 14/608,285, filed 29 Jan. 2015, entitled "EXCLUSIVE DELIVERY OF CONTENT WITHIN GEOGRAPHIC AREAS", now U.S. Pat. No. 9,286,625 issued on 15 Mar. 2016, which claims priority from U.S. Non-provisional patent application having Ser. No. 13/856,392, filed 3 Apr. 2013, entitled "EXCLUSIVE DELIVERY OF CONTENT WITHIN GEOGRAPHIC AREAS", now U.S. Pat. No. 8,977,247 issued on 10 Mar. 2015, which claims priority from U.S. Non-provisional patent application having Ser. No. 12/434,094, filed 1 May 2009, entitled "EXCLUSIVE DELIVERY OF CONTENT WITHIN GEOGRAPHIC AREAS", now U.S. Pat. No. 8,433,296 issued on 30 Apr. 2013, all having a common applicant herewith and being incorporated herein in their entirety by reference.

FIELD

This disclosure relates generally to delivery of content, and more particularly to delivery of content within reserved geographic areas.

BACKGROUND

Advertisements can be delivered to various devices, including mobile devices, within communications range of areas transmitters or other information providers. For example, advertisements can be delivered to cellular phones within range of a particular cellular phone provider's network area. Furthermore, advertisements can be delivered using digital billboards, or via the Internet, based on user interactions and preferences.

When delivering advertisements and other content to some mobile devices, currently available technologies can broadcast the content to all devices equipped to receive them. In some cases, advertisements are broadcast to any mobile device within a city, or a similar area. When delivering non-broadcast content, for example via the Internet, it is common to deliver the content in response to a request, received from the receiving device. In some cases, push technology can be used to deliver content to multiple users concurrently.

In each of these cases, a mobile device can usually receive content from multiple different content providers. Current technologies are, therefore, less than perfect.

SUMMARY

Various embodiments disclosed herein include registering an application program for use with a content delivery platform, establishing multiple perimeters defining respective geographic areas, and maintaining records associating sponsors with particular geographic areas. The content delivery platform can receive a request from a registered application program for content to be displayed on a mobile device, and the request can be used to determine a target location. In some embodiments, a sponsor is selected based on a relationship between the target location and one or more reserved geographic areas. Content is then provided to the application program.

In some embodiments, the content delivery platform can record a request identifier associated with a received request, and provide the request identifier to the mobile device to assist in tracking future actions relating to the request for content. The content delivery platform can also receive information related to user interaction with the provided content, including the request identifier, and provide additional content in response to the received information.

Content can be delivered to a mobile device running a registered application if a target location is at least partially within a predetermined radial distance of a geographical area associated with a sponsor; if the mobile device is not located within the predetermined radial distance, the radial distance can be increased. In some embodiments, content is delivered if the target location, e.g. the location of the mobile device or another location of interest, is located entirely within a geographic area exclusively reserved by a particular sponsor. In some embodiments, the content delivery platform can select from among several sponsors in deciding which content to deliver to a mobile device.

In at least one embodiment, the content delivery system reserves exclusive interests in geographic areas for particular sponsors based on the sponsors' requests, and store a record of that interest. In some embodiments, the content delivery system receives, from a sponsor, content to be delivered to mobile devices based on a target location being positioned within particular geographic areas. The content delivery system can also reserve an interest in geographic areas that remain unreserved by other sponsors. Furthermore, some embodiments include time based restrictions.

Various embodiments can be implemented as a system that includes memory, a communications interface, and a processor that cooperate to store and execute a program of instructions implementing various methods and techniques described herein. Furthermore, some embodiments can be implemented as a computer readable medium tangibly embodying a program of instructions.

DETAILED DESCRIPTION

Various embodiments of the present disclosure provide for delivering content, such as advertising, to registered applications being run on any of various mobile electronic devices configured to be readily moved, carried, or otherwise transported between different various geographic areas defined by perimeters. Sponsors can reserve an exclusive interest, or in some embodiments a semi-exclusive interest, in a geographic area, so that other sponsors' advertisements are excluded from being broadcast or otherwise provided to a registered program being executed on a mobile device located within a reserved geographic area.

Figure 1:
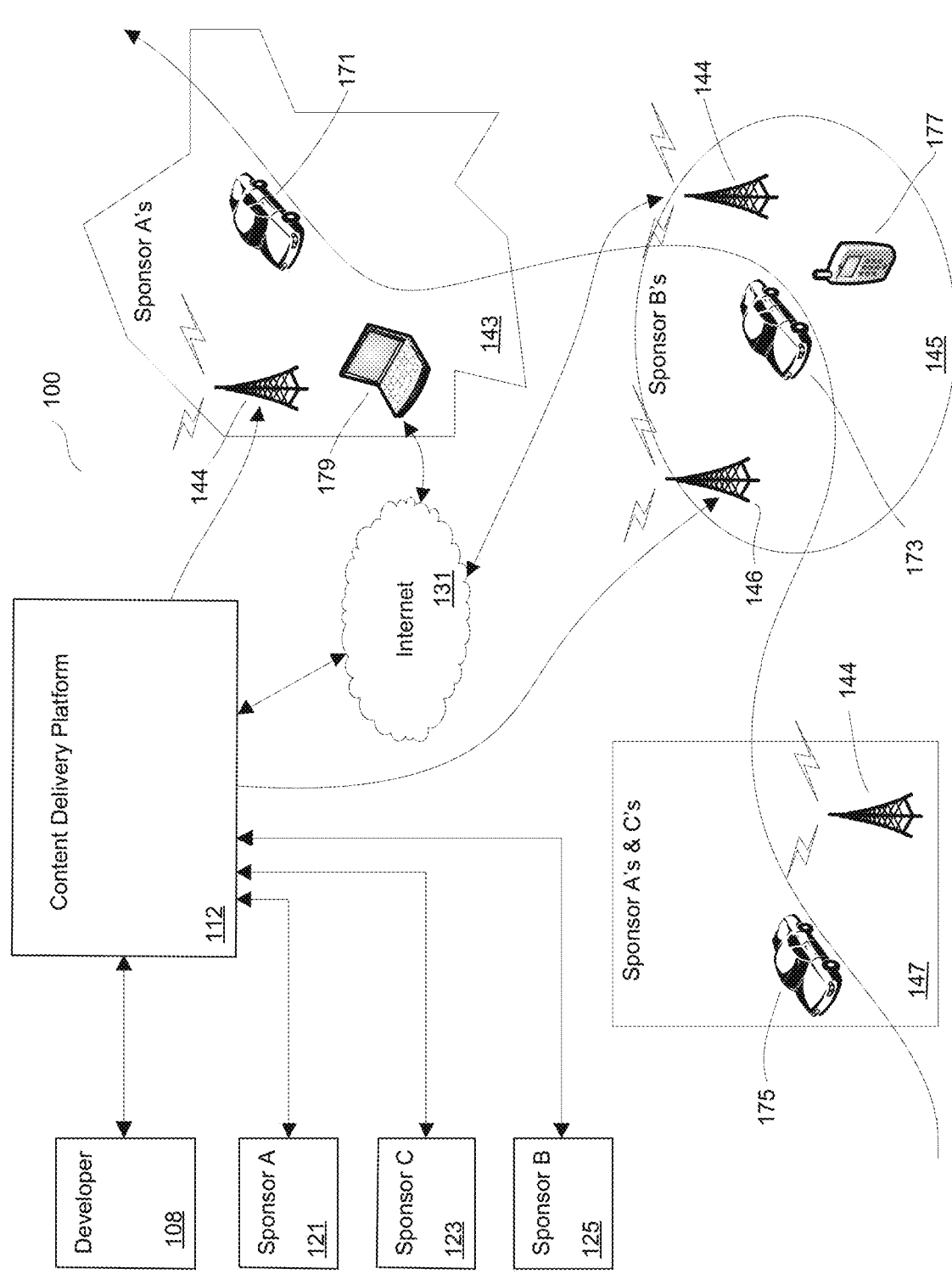
FIG. 1 is an abstract representation of exclusive content delivery to particular reserved areas according to various embodiments of the present disclosure.

Referring first to FIG. 1, system 100, is illustrated. System 100 can provide for exclusive delivery of advertising or other content to registered applications running on mobile devices located within a particular proximity to a reserved geographic area. System 100, as illustrated, includes content delivery platform 112, which is in communication with developer platform 108, and systems or individuals operating under control of sponsor A 121, sponsor C 123, and sponsor B 125. Content delivery platform 112 receives a request from developer platform 108 to register a program or other application for use on mobile devices. Content delivery platform 112 can use the registered application program to provide selected content to mobile devices.

In some embodiments, a registered application program is provided to mobile devices by developer platform 108, content delivery platform 112, one of sponsor A 121, sponsor C 123, or sponsor B 125, or by another desired delivery mechanism. In some embodiments, registering the application program with content delivery platform 112 allows developer 108 to receive revenue from sponsor A 121, sponsor C 123, or sponsor B 125 for content displayed on a mobile device located within, or in proximity to, a geographical area reserved by one or more of the sponsors.

Sponsor A 121, sponsor C 123, or sponsor B 125 can reserve an exclusive interest in a particular geographic area by sending a request to content delivery platform 112. In some embodiments, the request can be for exclusive delivery of content to mobile devices running any registered application within given geographic areas, or for content to be delivered to particular registered applications based on a target location. The request can also include time limitations, limitations based on the length of time a mobile device remains within a given geographic area, or other desired limitations. Furthermore, the reserved interest can be either completely exclusive, or semi-exclusive.

System 100 can include a network, for example Internet 131, through which content delivery platform 112, can communicate to other networked devices; and communication towers 144, which can include AM or FM broadcast towers, mobile telephone stations, or other suitable communication infrastructure, including satellites (not illustrated) that might be useful in providing content based on a target location. Content delivery platform 112 can use this communication infrastructure to communicate with various computing devices, including portable computer 179, which may include laptop computers, desktop computers, palmtop computers, tablet computers, digital video recorders (DVRs), television set-top boxes, or any of various general or dedicated purpose computers that can be carried or transported; wireless device 177, which can include personal digital assistants (PDAs), cellular telephones, personal communication system (PCS) devices, music players, video players, gaming consoles, or portable televisions; or any of various devices that may be included in, or carried by, motor vehicles 171, 173, or 175, including navigation systems, satellite radios, or the like. It should be noted that the term "mobile device" can include all computing devices as listed above that can communicate with content delivery platform 112, that the above listing of devices is not exhaustive, and that a device that qualifies as one type of device may also be considered to be of another type. For example, a mobile phone may also be a general purpose computing device, a radio, a television, and a navigation system.

Still referring to FIG. 1, consider first motor vehicle 171, which is located within sponsor A's reserved geographic area 143. A driver of first motor vehicle 171 can receive advertisements or other content from Sponsor A via a registered application running on a radio, a PDA, a cellular telephone, a laptop, or a global positioning navigation device (none of which are specifically illustrated). In this example, because first motor vehicle 171 is located within sponsor A's reserved geographic area 143, content delivery platform 121 provides content exclusively related to sponsor A 121; advertisements or other content from sponsor C 123 and sponsor B 125 can be excluded.

Portable computer 179 can be connected to Internet 131 via a hardwired network connection, a Wi-Fi connection or other suitable communication connection. In some embodiments, if portable computer 179 is running a registered program application, the user of portable computer 179 will receive content related exclusively to sponsor A as long as he is within sponsor A's reserved geographic area 143. In some embodiments, the driver of first motor vehicle 171 and the user of laptop 179 will still be able to receive advertisements from other sponsors through devices not running a program that has been registered on content delivery platform 112, or through non-registered programs running on the same device.

In some embodiments, the location of mobile devices, or another target location, can be determined using various suitable methods. For example, a mobile device running a registered application can provide location information to content delivery platform 112 in the form of latitude or longitude coordinates, raw or processed GPS data, or other location information received and recorded by either the device itself or another device. In some embodiments, a target location, e.g. the location of a mobile device, can be determined based on signals received from cellular transmission towers, satellites, or methods such as triangulation or dead reckoning, or by IP address. Content delivery platform 112 can receive the location of mobile devices from a third source, for example a location provider, a cellular telephone network provider, or a third party tracking source, rather than from the mobile device itself. Thus, the location of a mobile device can be received from the mobile device, determined by content delivery platform 112, received from a third-party source, or determined based on a combination of these or other methods.

Sponsor A's reserved geographic area 143 illustrates an embodiment in which a perimeter can be defined by streets, county boundaries, city boundaries, landmarks, or other features commonly found on maps. In contrast, sponsor B's reserved geographic area 145 can be an ellipse, circle, oval, or other geometric shape that can be determined, at least in part, based on a radius.

In this example, both second motor vehicle 173 and wireless device 177 are located within sponsor B's reserved geographic area 145. The driver of second motor vehicle 173 and the user of wireless device 177 can receive advertisements or other content via towers 144. For example, if the driver of second motor vehicle 173 is operating a navigation device executing an application program registered by developer 108, advertisements and other content received on the navigation device can be determined based on the location within sponsor B's reserved geographic area 145. Likewise, the user of wireless device 177 will receive advertisements related to sponsor B from within a registered application. In some embodiments, content delivery platform 112 can prevent content from sponsor A 121 and sponsor C 123 from being delivered to a mobile device carried by second motor vehicle 173 and wireless device 177, because both motor vehicle 173 and wireless device 177 are located in sponsor B's reserved geographic area 145.

Turning next to sponsor A and sponsor C's reserved geographic area 147, note that the perimeter is a square, rectangle or similarly shaped. In some embodiments, the perimeter may be defined entirely by longitude and latitude lines and/or coordinates that constitute an area. In other embodiments, sponsor A and sponsor C's reserved geographic area 147 can be partially bounded by a longitude or latitude line, a road, river, railway, county, state, parish, city, locality, or other desired boundary. In some embodiments, the perimeter of a sponsor A and sponsor C's reserved geographic area 147 can be defined by a combination of longitude or latitude lines, with one or more remaining boundaries defined based on radius or diameter.

Because third motor vehicle 175 is within sponsor A and sponsor C's reserved geographic area 147, a mobile device carried by third motor vehicle 175 can receive advertising content from either or both sponsor A and sponsor C. In some embodiments, the interest in sponsor A and sponsor C's reserved geographic area 147 can be equally divided between sponsor A 121 and sponsor C 123, while in other embodiments one of sponsor A 121 and sponsor C 123 can have an interest superior to that of the other. In some embodiments, content delivery platform 112 can deliver advertisements or other content related to Sponsor A at selected times, while content related to Sponsor C is delivered at other times. Additionally, content related to sponsor A may be delivered via a first registered application, while content related to sponsor C can be delivered via a second registered application. Thus, sponsors can advertise or provide other content to members of particular demographics based on a type of application a particular demographic is more likely to use.

Figure 2:
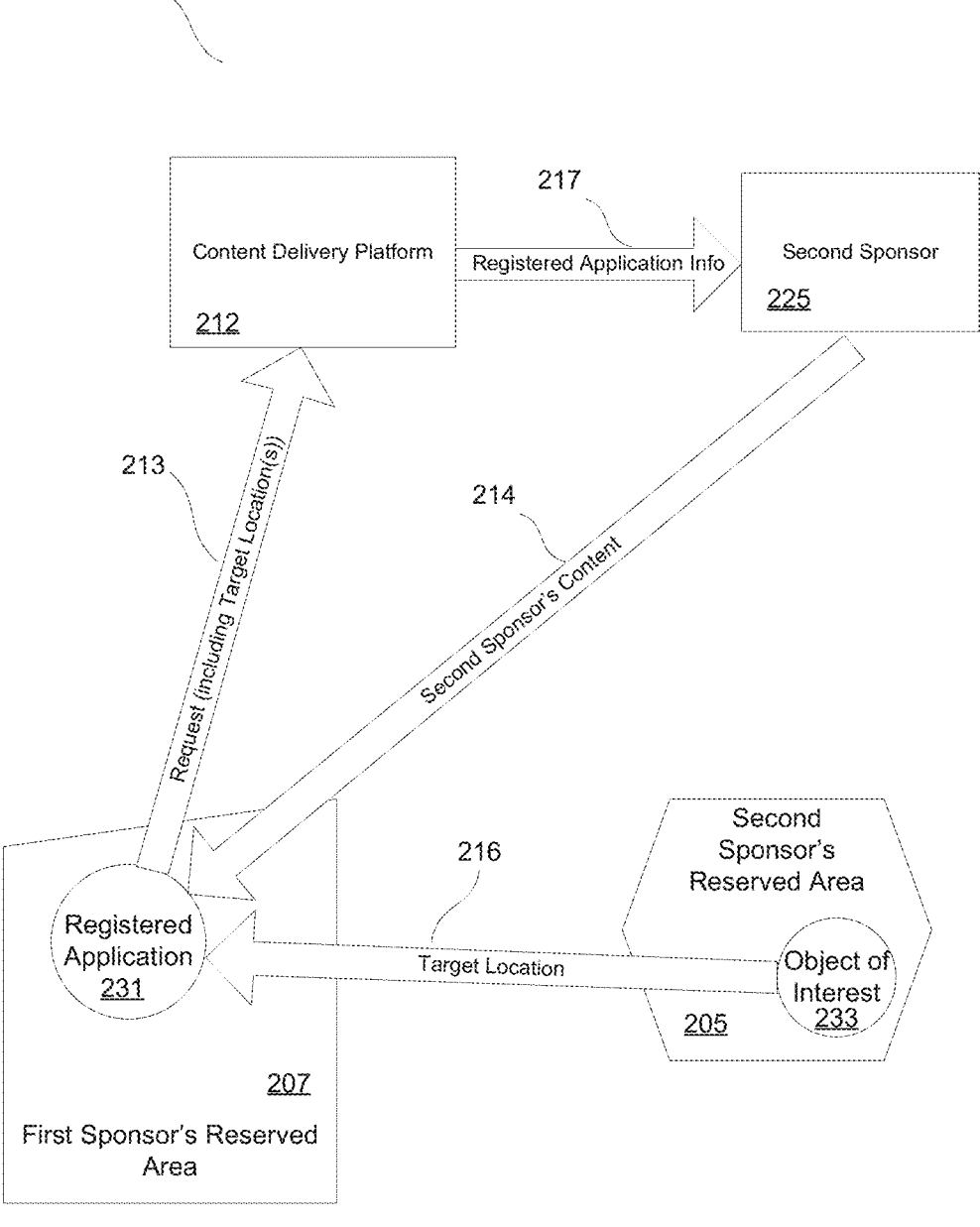
FIG. 2 is a diagram illustrating a target location other than the location of the mobile device executing a registered application, according to embodiments of the present disclosure.

Referring next to FIG. 2, a target location other than a mobile device in a system 200 is illustrated according to embodiments of the present disclosure. As shown in FIG. 2, a user of registered application 231 is located within the perimeter defining first sponsor's reserved area 207. Object of interest 233 is located in second sponsor's reserved area 205. In some embodiments, object of interest 233 can be any type of object of interest to the user of registered application 231. For example, object of interest 233 could be a friend of the user of registered application 231, and this friend may be employing a mobile phone, a laptop, a kiosk computer, a PDA, or any other device capable of sending location information 216 directly or indirectly to registered application 231. In some embodiments, target location information 216 can be any type of information that can be used to determine the location of the object of interest 233. In at least one embodiment, target location information 216 may be a geocoded twitter message. In another example, object of interest 233 could be an end destination on a map, and the location information 216 of this end destination can be sent to registered application 231.

In response to receiving the target location information 216 from object of interest 233, registered application 231 can send a request 213 to content delivery platform 212. The request can include, but is not limited to, information indicating the location of object of interest 233, a request for content, information indicating the location of registered application 231, information indicating the identity of the registered application 231, and a previously received request identifier.

Content delivery platform 212 can receive and process request 213 to identify the location of registered application 231 and the location of object of interest 233. In some embodiments, both locations need not be identified. Furthermore, in some embodiments the specific location need not be identified, as long as a determination that object of interest 233 is located within a given proximity of second sponsor's reserved area 205, or that registered application 231 is located within first sponsor's reserved area 207.

Content delivery platform 212 can provide registered application information 217 to second sponsor 225 to allow second sponsor 225 to deliver second sponsor's content 214 to registered application 231. The registered application information 217 can be an application identifier, a request identifier, a target location, a communications address, or other information that can be utilized by second sponsor 225. In some embodiments, application information 217 need not be provided to second sponsor 225, but instead can be processed internally by content delivery platform 212, and a determination can be made for second sponsor's content 214 to be delivered directly to application 231 from content delivery platform 212, or a third party (not illustrated).

Note that in the illustrated embodiment, despite the fact that registered application 231 is located within first sponsor's reserved area 207, the information delivered to registered application 231 can be content related exclusively to second sponsor's reserved area 205, in which object of interest 233 is located. This is because, in the illustrated embodiment, the target location is the location of object of interest 233, rather than the location of a mobile device executing registered application 231.

In some embodiments, information from the first sponsor can also be delivered to registered application 231, because the locations of the device running registered application 231 and object of interest 233 are both considered target locations. Furthermore, in some embodiments content need not be delivered directly from second sponsor 225, but instead can be provided by content delivery platform 212, or a third party (not illustrated).

Figure 3:
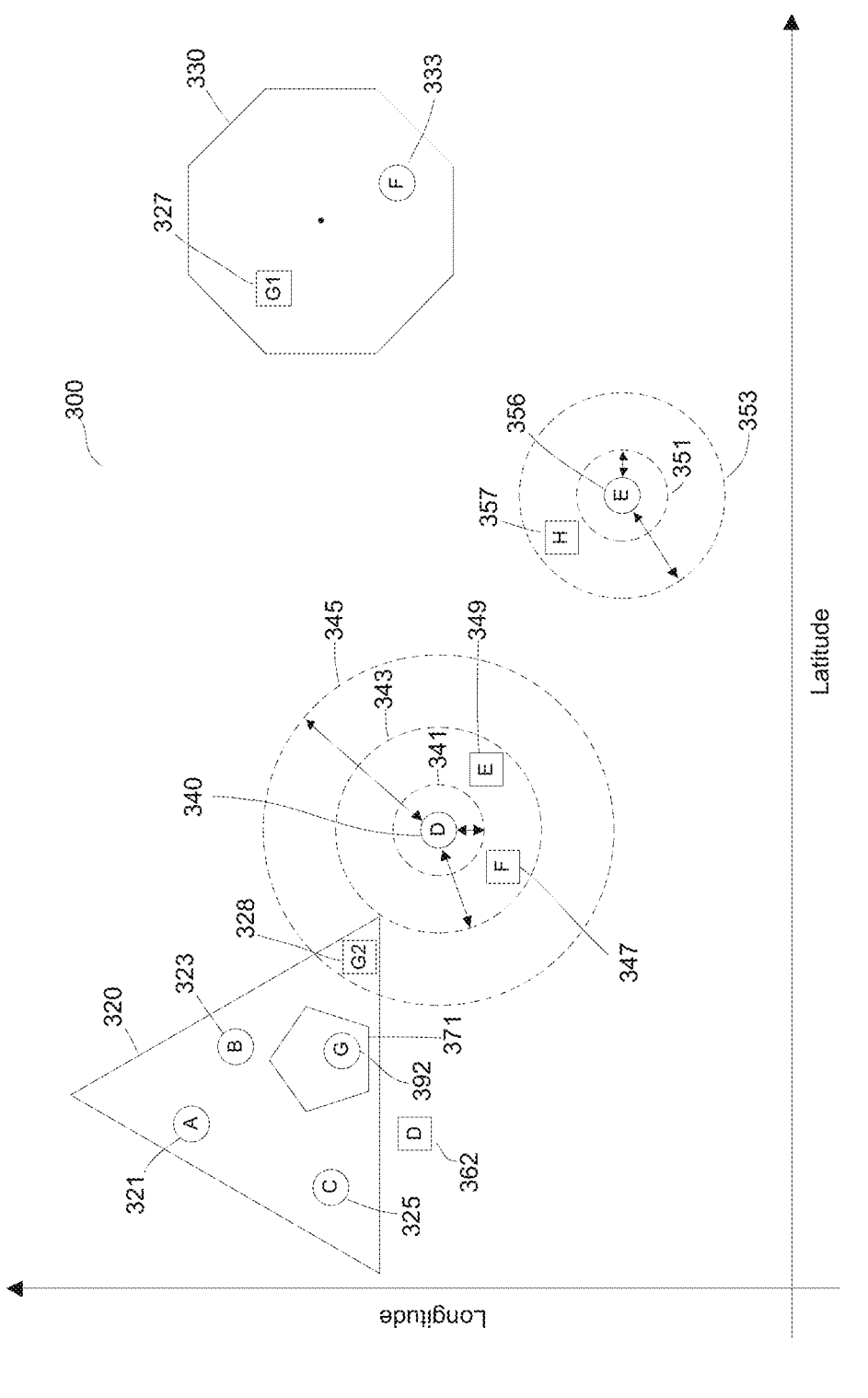
FIG. 3 is a graph representing expanded search areas to determine which content is delivered according to various embodiments of the present disclosure.

Referring next to FIG. 3, a graph showing various geographic areas with reference to longitude and latitude is illustrated according to some embodiments of the present disclosure. The geographic areas in FIG. 3 are for illustration only and carry no particular significance with respect to their geometric shapes. Graph 300 includes a triangular area 320, reserved for sponsor A; pentagonal area 371, reserved for sponsor G; and octagonal area 330, also reserved for sponsor G. In the illustrated example, sponsor G has two physical addresses: G 1 327, which lies within sponsor G's reserved octagonal area 330, and G 2 328 which, lies within sponsor A's reserved triangular area 320. Furthermore, in the illustrated embodiment, sponsor A does not have a physical location within sponsor A's reserved triangular area 320. These examples help illustrate that there is not necessarily a correlation between a sponsor's physical address and a reserved geographic area, although in some embodiments there may be such a correlation.

As illustrated by FIG. 3, a single target location F 333 is located within sponsor G's reserved octagonal area 330, and target location F 333 can be a mobile device running a registered application, or target location F 333 can represent a target location other than the location of a mobile device, as illustrated in FIG. 2. In some embodiments, the mobile device with target location F 333 receives advertising exclusively from advertiser G.

As further illustrated by FIG. 3, there are four target locations: target location A 321, target location B 323, target location C 325, and target location G 392 within advertiser A's reserved triangular area 320. Note also, however, that target location G 392 also lies within one of sponsor G's reserved geographic areas, pentagonal area 371. Consider the following example in which target location A 321 and target location B 323 each are mobile devices executing a first application registered with a content delivery platform, such as content delivery platform 112, of FIG. 1. Further assume, for purposes of this example, that target location C 325 is a mobile device executing a second, different application, which is also registered with the content delivery platform. Because both the first and second applications are registered with the content delivery platform, each of the three devices, with target location A 321 target location B 323 and target location C 325 can receive advertisements or other content from within their respective applications. In this example, the content delivered to all three devices can be related exclusively to sponsor A, regardless of which registered application is being executed, because sponsor A has the only reserved interest in the portions of triangular area 320 occupied by mobile devices having target locations A 321 B 323 and C 325.

In some embodiments, target location G 392 can be a mobile device running two or more registered applications, and can receive content related to sponsor A, because the mobile device lies within triangular area 320. But, target location G 392 also lies within pentagonal area 371, and the mobile device can therefore receive content associated with sponsor G. In some embodiments, content related to sponsor A can be delivered via one of the registered applications, while another registered application receives and displays content related to sponsor G. In other embodiments, one of sponsor A or sponsor G can have a superior interest to the other, and a preference can be given to that sponsor's content for delivery. For example, sponsor G may have a superior interest in pentagonal area 371, which also forms part of triangular area 320. In such a case, if content related to sponsor G is available for delivery to the application on the mobile device with target location G 392, that content will be delivered in preference to content related to sponsor A. However, if there is no high priority content related to sponsor G to be delivered, content related to sponsor A may be provided in its stead. Various other priority and time sharing mechanisms and methods can be implemented according to the teachings set forth herein. Note that in some embodiments, multiple registered applications are not required to implement priority and time sharing mechanisms.

In some instances, a mobile device can have target locations, such as target location D 324 or target location E 356, located outside of areas reserved by sponsors. In such a case, a check can be made to determine if either target location D 340 or target location E 356 are located within a given proximity of a sponsor-reserved area such as triangular area 320 or octagonal area 330. So, for example, a check can be made to determine whether any reserved areas lie within a given radius of target location D 340, defining a search area 341, or within a given radius of target location E 356, defining a search area 351. In some embodiments, if no sponsor reserved area intersects an area within an initially small radius, further checks can be performed by incrementally increasing the radius. So, for example, after a first check finds no advertiser reserved areas within search areas 341 or 351, the search areas can be increased to encompass areas 343 and 353, respectively.

In the illustrated example, there is no reserved area intersecting search area 353, but sponsor H 357 has a physical address within area 353. In some embodiments, once it is determined that a registered sponsor has a physical address location within a search radius, but there are no sponsor reserved geographic areas in proximity to or encompassing a target location, an advertisement or other content can be delivered to a mobile device, such as the device with target location 356.

Another situation arises when there are no sponsor reserved geographic areas intersecting a search area, but there are multiple sponsor physical locations within a given radius. Consider area 343, which contains sponsor E's location 349, and sponsor F's location 347. Because neither sponsor E nor sponsor F has established a reserved area that intersects with search area 343, a random choice can be made between these two sponsors to determine which sponsor's content to provide to the registered application on the device with target location D 340. In other embodiments, preference may be given to one of sponsor E's location 349 and sponsor F's location 347 based on each physical locations' proximity to target location D 340, based on a travel time between the device with target location D 340 and the sponsors' locations, or based on some other desired parameter. In further embodiments, if no sponsor's reserved geographic area intersects any portion of area 343, no content is sent to mobile device D with target location 340, despite the fact that location sponsor E's location 359, and sponsor F's location 347 are both within the perimeter defining search area 343.

In some embodiments, the search radius can continue to be expanded until a search area 345 intersects with a sponsor reserved geographic area. In the illustrated embodiment, search area 345 intersects sponsor A's reserved triangular area 320. Note that sponsor G 2's physical location 328 is also located within search area 345. In some embodiments, content from either sponsor A or sponsor G can be selected using any of various processes, because target location D 340 is not located entirely within triangular area 320. In some embodiments, however, because the expanded search area 345 encompasses even a portion of sponsor A's reserved triangular area 320, content related to sponsor G will be excluded, and content related to sponsor A will be exclusively provided to mobile device with target location D 340. In some embodiments, because target location D 340 is not located within sponsor A's reserved triangular area 320, content related to sponsor A will be excluded, and content related to sponsor G will be exclusively provided to mobile device with target location D 340.

Additional techniques accounting for the proximity of exclusively reserved advertising areas and sponsor's physical locations with respect to mobile device locations can be implemented according to the teaching set forth herein. For example, in some embodiments, sponsors may obtain an interest in all otherwise unreserved geographic areas. For example, a content delivery system can deliver content from a "default" sponsor, if it is determined that no other content is to be delivered to a mobile device.

Figure 4:
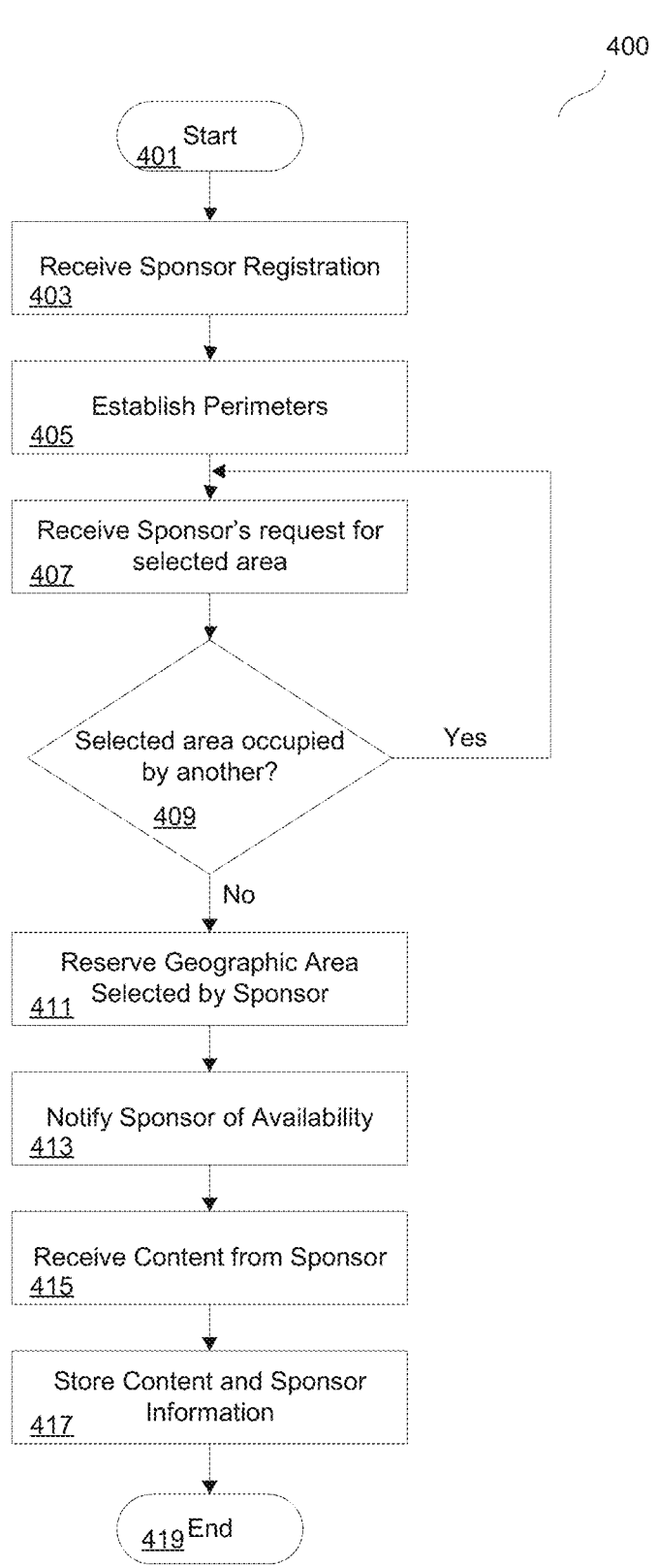
FIG. 4 is a flowchart illustrating a method of reserving a geographic area according to embodiments of the present disclosure.

Referring next to FIG. 4, a method 400 for allowing sponsors to reserve particular geographic areas will be discussed according to embodiments of the present disclosure. Method 400 begins, as illustrated by block 401. As illustrated by block 403, a content delivery platform, for example content delivery platform 112 as illustrated in FIG. 1, can receive a request for sponsor registration, which can also include receiving physical address location from the sponsor. As illustrated by block 405, the sponsor can establish perimeters defining geographic areas of exclusive or semi-exclusive control. These geographic areas are areas the sponsor wishes to reserve for delivery of his own advertisements or other content controlled by the sponsor.

The perimeters established can be based on map features, such as streets, rivers, landmarks, or any of the other various map features. The perimeters can also be defined by latitude and longitude, or various geometric constructs having a given relative position to either a point location, a map location, a physical address, or otherwise. Some embodiments allow for establishing perimeters defining areas based on a combination of the various types of constructs. So, for example, latitude, longitude and map features may be used to establish the reserved area, or a combination of coordinates and geometric constructs can be used in conjunction with other suitable boundary identifiers to establish an area that may be reserved specifically for content related to a particular advertiser or sponsor.

In some embodiments, the perimeters may be generated interactively, using sponsor established perimeter definitions, or other unique sponsor requests. Some embodiments employ pre-defined areas, or allow selection of areas based on predetermined factors, and present sponsors a choice from among previously established options.

As illustrated by block 407, a sponsor's request for a selected area is received. As illustrated by block 409, a check is made to determine if the selected area, or a portion of the selected area, has already been reserved by another sponsor. If the area selected by the sponsor is already owned or is otherwise unavailable, method 400 may return to block 407, and the sponsor can choose another area. In some embodiments, overlap of various sponsor areas may be allowed based on type of business, type of application used to deliver the content, or otherwise.

As illustrated by block 411, if an area selected for exclusive or semi-exclusive content delivery is available, the selected geographic area can be reserved for the sponsor. And as illustrated by block 413, the sponsor can be notified that an interest in the geographic area has been reserved for him.

A sponsor can provide content for delivery to mobile devices having target locations contained within its reserved area, as illustrated by block 415. This content can include advertisements, still image content, animated content, video content, audio content, alphanumeric identifiers, or other content suitable for delivery to mobile devices via registered applications. As illustrated by block 417, the content received from the sponsor can be stored for later delivery to registered applications running on mobile devices having target locations that exist within the sponsor's reserved area, which such target locations may include, but are not limited to, when the mobile device or target location physically enters or remains within the sponsor's reserved area for a desired length of time. In some embodiments, content can be delivered to a mobile device by the sponsor or another party in response to a notification that the mobile device or target location has entered or is contained within the sponsor's reserved area. Method 400 ends, as illustrated at block 419.

Figure 5:
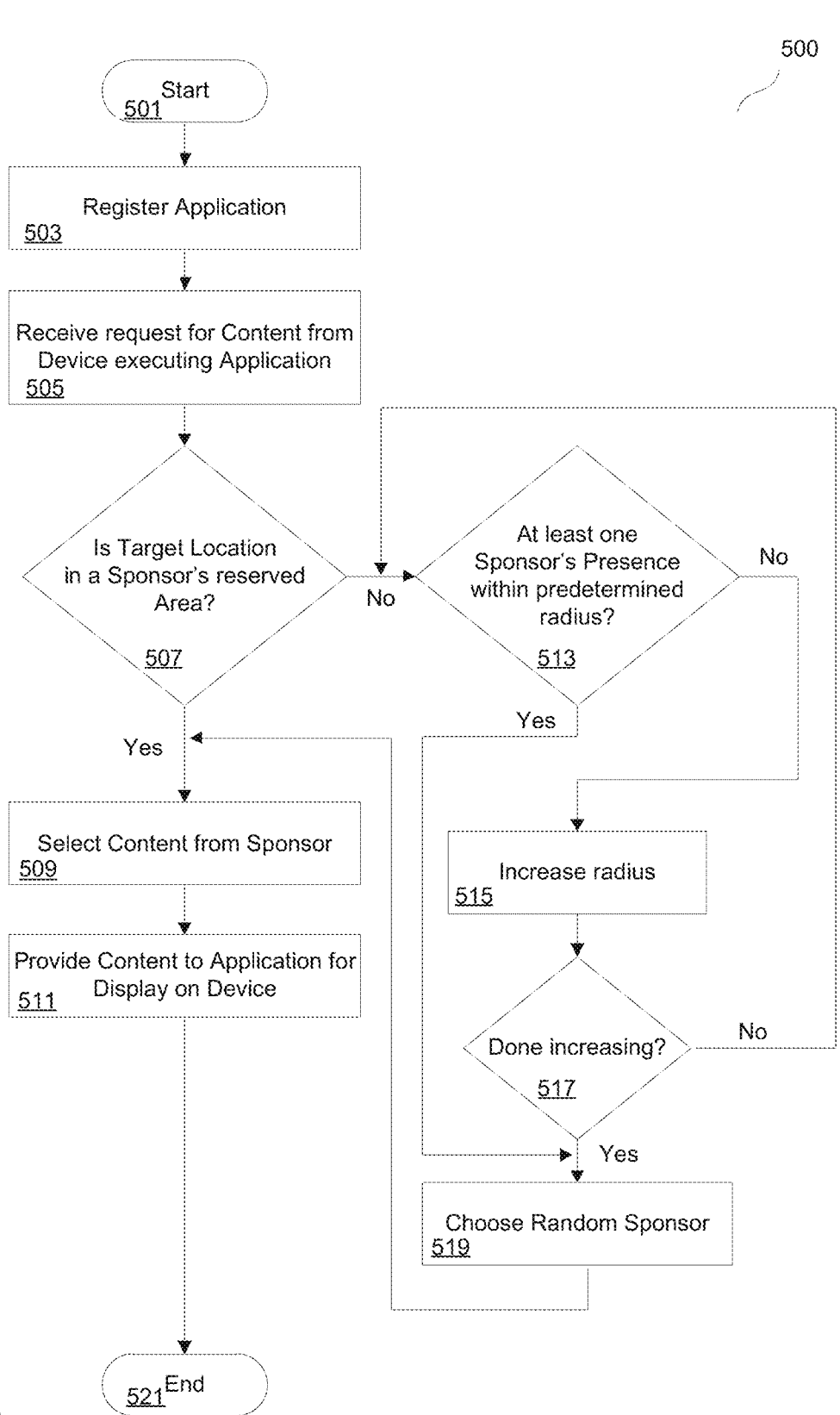
FIG. 5 is a flowchart illustrating registration of an application for content delivery according to embodiments of the present disclosure.

Referring next to FIG. 5, a method 500 of registering an application program for use in conjunction with a content delivery platform is illustrated according to various embodiments of the present disclosure. Method 500 begins as illustrated by block 501. As illustrated by block 503, an application can be registered on a content delivery platform in response to a request by a developer, for example developer 108 as illustrated in FIG. 1. As illustrated by block 505, a request for content can be received from a device running a registered application. In some embodiments, the same registered application may be executed on any of various mobile devices, including mobile telephones, personal digital assistants, laptops, and the like. Furthermore, multiple devices may execute copies of the same registered application, multiple different registered applications may be executed on a single mobile device, and multiple different registered applications may be executed on multiple devices.

As illustrated by block 507 a determination is made as to whether the application sending the request for content has a target location that is located within a sponsor's reserved geographic area. In some embodiments, the target location may be the location of the device. In some embodiments, the target location may be a location other than the location of the device, as illustrated in FIG. 2. As illustrated by block 509, if the target location is located within a sponsor's reserved area, content from the corresponding sponsor can be chosen for delivery to the mobile device. The content can be chosen based on a number of different parameters or combinations of parameters. In some embodiments, different sponsors may designate particular content to be provided on different days of the week or at different times of day. Some such embodiments allow a single geographic area to be shared by different advertisers or sponsors. For example, content associated with a first sponsor may be selected for delivery in a particular geographic area during the lunch hour, while content related to a second sponsor is selected for delivery in that same geographic area between the hours of midnight and 2 am.

In some embodiments, content from one sponsor can be selected for delivery in a particular geographic area in specific situations, even though a different sponsor has generally reserved that same geographic area. For example, content from a first sponsor can be delivered during a football game to mobile devices located in a geographic area normally reserved by a second sponsor, effectively trumping content related to the second sponsor that would otherwise be delivered. In some embodiments, additional criteria can be applied to determine which sponsors' content will be provided to mobile devices in a particular geographic area.

As illustrated by block 511, selected content can be provided to an application for display on a mobile device. In at least one embodiment, different content from the same sponsor can be provided to the same device for display within different applications, or the same content from the same sponsor can be displayed for all mobile devices running all registered applications that have target locations within the delivery area for the content. For example, a first program run on a mobile device may display a first advertisement within that program while a second program running on the same device may display a second advertisement, which is different from the first advertisement. In some embodiments in which an interest in a particular geographic area is shared between multiple sponsors, a primary sponsor's content can be exclusively displayed via a first registered application running on a particular mobile device, while content from other sponsors can be displayed via a second and subsequent applications running on the same mobile device.

As illustrated by block 513, if the target location is not within a sponsor's reserved area, a determination can be made regarding whether at least one sponsor's presence is within a first predetermined radius of the target location. In some embodiments, a determination is made regarding whether a sponsor's physical location is within a predetermined radius of the target location. In some embodiments, a determination is made regarding whether a sponsor's geographic area, or a portion of a sponsor's geographic area, is contained within a predetermined radius of the target location. If at least one sponsor's presence is within a predetermined radius of the target location, a sponsor is chosen from a random or pseudo-random process, as illustrated by block 519. Content is then selected for delivery, as illustrated by block 509. As illustrated by block 515, if a sponsor's presence is not within a predetermined radius of the target location, the search radius can be increased. As illustrated by block 517, a check can be made to determine whether any more increases should be made. In some embodiments, the search radius can continue to be increased incrementally, in a logarithmic manner, or otherwise, until at least a portion of a sponsor's reserved area intersects the search area defined by the search radius. In some embodiments, the search radius can be increased a predetermined number of times, or can be limited based on system resources, time constraints, or other desired parameters. The processes illustrated by blocks 513, 515, and 517 can be repeated until a positive indication is produced by the process at block 517.

As illustrated by block 519, content from a randomly or pseudo-randomly selected sponsor can be delivered to a mobile device if the target location is not within a desired proximity to a sponsor's reserved area. In some embodiments, rather than delivering content randomly, content selections can be made based on desired criteria. Content related to a sponsor that reserved all otherwise unallocated space can be delivered to a mobile device executing a registered application. In some such embodiments, if any particular geographic areas have not yet been reserved, or if any device requesting content does not have a target location contained within a reserved geographic area, the default sponsor's content can be delivered to the mobile device. Method 500 ends as illustrated by block 521.

Figure 6:
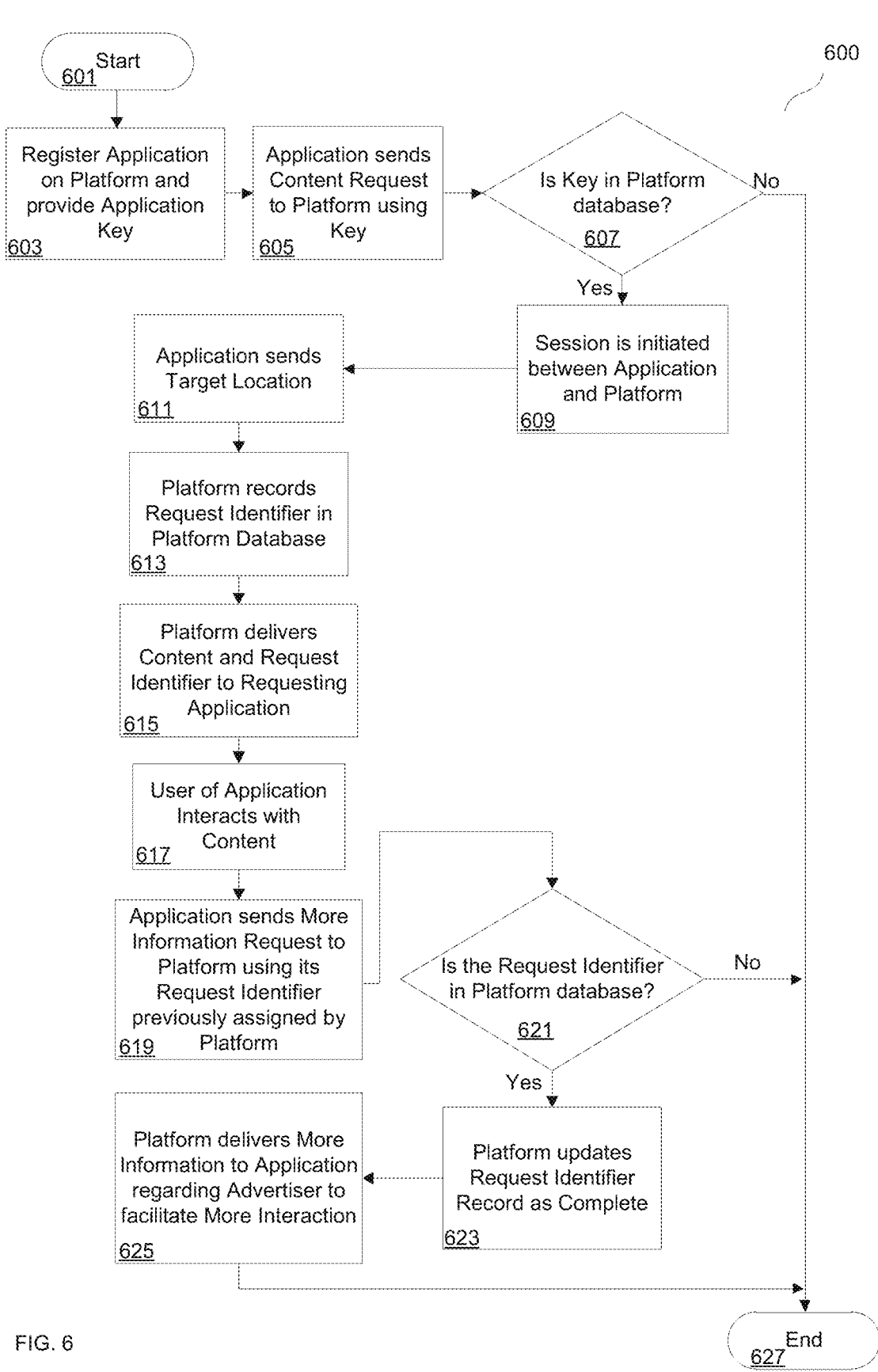
FIG. 6 is a flowchart illustrating delivery of content to particular applications in a reserved area according to embodiments of the present disclosure.

Preferring next to FIG. 6, a method of interaction between a mobile device and a content providing platform is illustrated according to various embodiments of the present disclosure. Method 600 begins as illustrated by block 601. As illustrated by block 603 an application platform key can be provided to a developer in response to the developer registering an application for use on the application platform. The developer can, in turn, provide the key to mobile devices on which the registered application is installed. As illustrated by block 605, when a mobile device requests content from the content providing platform, the mobile device can send the key along with its request. As illustrated by block 607, the content providing platform can verify that the key matches a valid key stored in its database, or elsewhere, before providing content to the application.

In some embodiments, key verification can be performed by an entity other than the content providing platform. As illustrated by block 627, if a verification check on the key fails, no content is provided to the requesting application, and the method 600 ends.

As illustrated by block 609, if the key is validated a session can be initiated between the application on the mobile device, and the content delivery platform. As illustrated by block 611 in at least one embodiment, the application running on the mobile device sends the mobile device's location, or another target location, to the content delivery platform. However, in some embodiments the actual location is not sent by the device, but may be provided to the content delivery platform from another source. Furthermore, the content delivery platform, or a subsystem of a communications system employed by the content delivery platform, can determine the location of the mobile device based on raw, partially, or completely processed information received from the mobile device or from another source. For example, the mobile device can forward information associated with a target location to the content delivery platform, or the content delivery server can obtain location information from a third party application or device, from a home location register (HLR), from a visiting location register (VLR), from raw, differential, processed or semi-processed GPS data, from power signals used in code-division multiple access (CDMA) or other wireless communications systems, or otherwise.

As illustrated by block 613, the content delivery platform records the request from the registered application in a request identifier in the platform database, or some other suitable storage location. The request identifier can be used in some embodiments to track further interaction with the registered application, or to deliver additional content to a requesting mobile device. Thus, in some embodiments, a mobile device or other target location that is only temporarily located within a particular sponsor's reserved geographic area may continue to receive information from that sponsor after the mobile device, or the target location, exits the sponsor's reserved area. In other embodiments, content related to a sponsor is discontinued in response to a mobile device exiting, or the target location losing focus within, the sponsor's reserved area.

As illustrated by block 615, the content delivery platform can deliver the request identifier to the requesting application along with the requested content. As illustrated by block 617, a user of the mobile device can interact with the provided content using any of various methods such as pressing a button, selecting a user selectable object on a graphical user interface, or otherwise. The application on the mobile device can send an indication of the interaction to the content delivery platform via the same communication channel used to send the request, or via a different communications channel.

As illustrated by block 619, a registered application running on a mobile device can send an additional information request to the platform using the previously assigned request identifier. In some embodiments, using the previously assigned platform request identifier permits tracking of a series of interactions between a particular application and the content delivery platform. Furthermore, using the request identifier can allow individualized content to be delivered to different registered applications which may or may not be running on the same mobile device.

As illustrated by block 621, a determination is made regarding whether a request identifier sent in conjunction with a request for further information is maintained in the platform database or other suitable storage. As illustrated by block 623, if the request identifier is contained in the database or other storage area, the content delivery platform can update a request identifier record as being complete. And as illustrated by block 625, the content delivery platform can deliver more content to the requesting application. As illustrated by block 627, method 600 can proceed to end after delivering the additional content.

Figure 7:
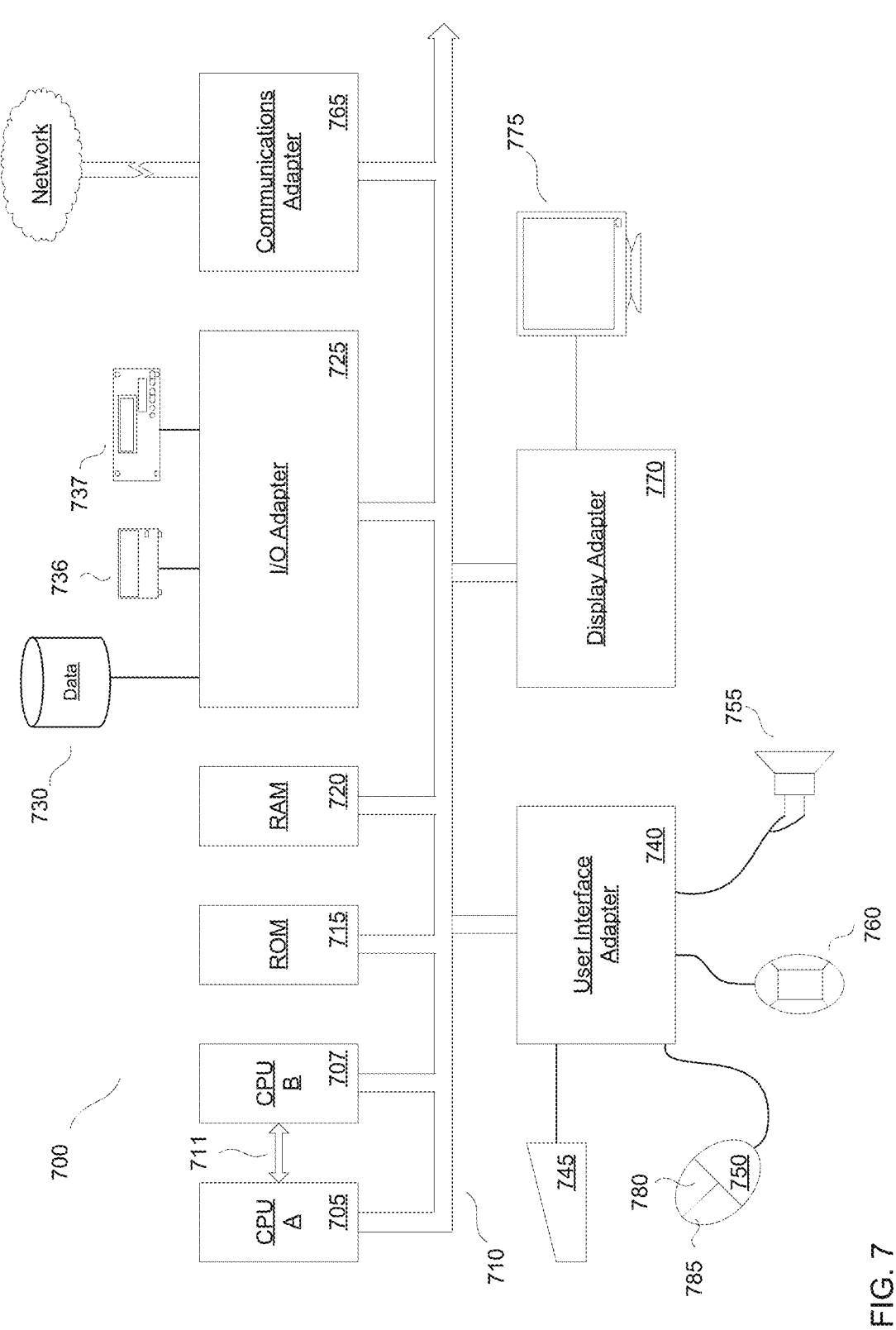
FIG. 7 is a diagram illustrating a processing system according to embodiments of the present disclosure.

The methods and processes discussed previously, as well as other embodiments, may be implemented in a processing system executing a set of instructions stored in memory, or on a removable computer readable medium. An example of a system according to some embodiments is illustrated in FIG. 7. Referring now to FIG. 7, a high-level block diagram of a processing system is illustrated and discussed. Processing system 700 includes one or more central processing units, such as CPU A 705 and CPU B 707, which may be conventional microprocessors interconnected with various other units via at least one system bus 710. CPU A 705 and CPU B 707 may be separate cores of an individual, multi-core processor, or individual processors connected via a specialized bus 711. In some embodiments, CPU A 705 or CPU B 707 may be a specialized processor, such as a graphics processor, other co-processor, or the like.

Processing system 700 includes random access memory (RAM) 720; read-only memory (ROM) 715, wherein the ROM 715 could also be erasable programmable read-only memory (EPROM) or electrically erasable programmable read-only memory (EEPROM); and input/output (I/O) adapter 725, for connecting peripheral devices such as disk units 730, optical drive 736, or tape drive 737 to system bus 710; a user interface adapter 740 for connecting keyboard 745, mouse 750, speaker 755, microphone 760, or other user interface devices to system bus 710; communications adapter 765 for connecting processing system 700 to an information network such as the Internet or any of various local area networks, wide area networks, telephone networks, or the like; and display adapter 770 for connecting system bus 710 to a display device such as monitor 775. Mouse 750 has a series of buttons 780, 785 and may be used to control a cursor shown on monitor 775.

It will be understood that processing system 700 may include other suitable data processing systems without departing from the scope of the present disclosure. For example, processing system 700 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, propagate, or transport the program for use by or in connection with the instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Data structures and transmission of data (including wireless transmission) particular to aspects of the disclosure are also encompassed within the scope of the disclosure.

Various embodiments have been described for delivering content related to a commercial media program. Other variations and modifications of the embodiments disclosed may be made based on the description provided, without departing from the scope of the invention as set forth in the following claims.

What is claimed is:

1. A method for improving location services for an application program on a mobile device by using the mobile device in combination with one or more other mobile devices, the method comprising:

receiving, from the one or more other mobile devices and via a content delivery platform, information corresponding to a geographic location of each of the one or more other mobile devices, wherein the information is to be used, in combination with signal information received from a third-party wireless communications source, for determining the geographic location of the mobile device;

receiving, from the mobile device and via the content delivery platform, location information associated with the mobile device;

in response to receiving the location information associated with the mobile device, delivering, from the content delivery platform and exclusively to the mobile device and not to the one or more other mobile devices, content previously received by the content delivery platform, the delivering based on an association of the content with a geographic area and on the location information associated with the mobile device indicating that the mobile device is within the geographic area;

receiving, by the mobile device, information comprising the content from the delivering;

receiving signal information sent by the third-party wireless communications source; and using, at least in part and via a subsystem of a communications system employed by the content delivery platform and at least one processor, information received from the mobile device and the signal information received from the third-party wireless communication source to determine the geographic location of the mobile device.

2. The method of claim 1, further comprising: in response to the determination of the geographic location of the mobile device, displaying a first advertisement on the display of the mobile device via the application program.

3. The method of claim 2, wherein:
the content comprises data representing one or more alphanumeric identifiers associated with physical locations within the geographic area; and
the information received from the mobile device used to determine the geographic location of the mobile device is associated with at least one target location of the one or more other mobile devices; and further comprising:
using cache memory with the at least one processor to reduce the number of times code must be retrieved to execute the method; and
performing a verification whether the application program on the mobile device has authorization to initiate a location session with the content delivery platform, wherein:
    if the verification passes, allowing the application program to initiate the location session with the content delivery platform;
    if the verification fails, not allowing the application program to initiate the location session with the content delivery platform; and
    performing the verification comprises performing a check on a key associated with the application program and stored on the mobile device.
4. The method of claim 1, wherein the content comprises data representing one or more alphanumeric identifiers associated with physical locations within the geographic area.
5. The method of claim 4, wherein the geographic area is defined by the area contained within a predetermined radial distance surrounding the location of the mobile device.

6. The method of claim 5, wherein the information received from the mobile device used to determine the geographic location of the mobile device is associated with at least one target location of the one or more other mobile devices.
7. The method of claim 5, wherein, in the event no physical locations having alphanumeric identifier associations are found within the geographic area, increasing the predetermined radial distance until at least one physical location having an alphanumeric identifier is found within the geographic area.
8. The method of claim 1, further comprising: using cache memory with the at least one processor to reduce the number of times code must be retrieved to execute the method.
9. The method of claim 1, further comprising:
performing a verification whether the application program on the mobile device has authorization to initiate a location session with the content delivery platform.
10. The method of claim 9, wherein:
if the verification passes, allowing the application program to initiate the location session with the content delivery platform; and
if the verification fails, not allowing the application program to initiate the location session with the content delivery platform.
11. The method of claim 10, wherein: performing the verification comprises performing a check on a key associated with the application program and stored on the mobile device.

* * * * *